(12) United States Patent
Zilli

(10) Patent No.: US 12,479,586 B2
(45) Date of Patent: Nov. 25, 2025

(54) FUSIBLE MOUNTING ASSEMBLY FOR GAS TURBINE ENGINE

(71) Applicant: ROLLS-ROYCE plc, London (GB)

(72) Inventor: Andrea Zilli, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/403,130

(22) Filed: Jan. 3, 2024

(65) Prior Publication Data

US 2024/0246687 A1 Jul. 25, 2024

(30) Foreign Application Priority Data

Jan. 25, 2023 (GB) ...................................... 2301053

(51) Int. Cl.
*B64D 27/40* (2024.01)
(52) U.S. Cl.
CPC .................................. *B64D 27/404* (2024.01)
(58) Field of Classification Search
CPC ...... B64D 27/404; B64D 27/12; B64D 27/40; F02C 7/20; F16B 2200/63
See application file for complete search history.

(56) References Cited

U.S. PATENT DOCUMENTS

| | | | |
|---|---|---|---|
| 4,717,094 A * | 1/1988 | Chee | B64D 27/18 244/54 |
| 4,725,019 A | 2/1988 | White | |
| 5,275,357 A | 1/1994 | Seelen et al. | |
| 5,303,880 A | 4/1994 | Cencula et al. | |
| 5,927,644 A | 7/1999 | Ellis et al. | |
| 6,212,974 B1 | 4/2001 | Van Duyn | |
| 6,669,393 B2 | 12/2003 | Schilling | |
| 8,251,311 B2 | 8/2012 | Combes et al. | |
| 9,227,734 B2 | 1/2016 | Zheng et al. | |
| 9,248,921 B2 | 2/2016 | West | |

(Continued)

FOREIGN PATENT DOCUMENTS

| | | |
|---|---|---|
| EP | 2133268 A2 | 12/2009 |
| EP | 2410202 A1 | 1/2012 |

(Continued)

OTHER PUBLICATIONS

European search report dated Jun. 11, 2024, issued in EP Patent Application No. 24150101.4.

(Continued)

*Primary Examiner* — Joshua D Huson
*Assistant Examiner* — Shanna Danielle Glover

(57) ABSTRACT

A mounting assembly includes an engine mount link, an engine mount block, a fusible component, and a catcher component. The engine mount block is connected to a pylon and the engine mount link. The fusible component and the catcher component have respective first and second shear strengths. The catcher component is disposed within a catcher aperture. When an applied shear stress on the fusible component is less than the first shear strength, the engine mount link is stationary with respect to the engine mount block. When the applied shear stress on the fusible component exceeds the first shear strength, the fusible component mechanically fails and causes the catcher component to move relative to the catcher aperture further causing a corresponding movement of the engine mount link.

9 Claims, 15 Drawing Sheets

SECTION A-A'

(56) References Cited

U.S. PATENT DOCUMENTS

| | | | |
|---|---|---|---|
| 9,701,412 | B2 | 7/2017 | Stretton et al. |
| 10,220,950 | B2 | 3/2019 | Zheng et al. |
| 12,060,835 | B2 * | 8/2024 | Martin .................. F02C 7/32 |
| 2017/0260908 | A1 | 9/2017 | Jiang et al. |
| 2023/0331391 | A1 * | 10/2023 | Torjesen ................ B64F 5/10 |

FOREIGN PATENT DOCUMENTS

| | | |
|---|---|---|
| EP | 3219961 A1 | 9/2017 |
| EP | 2935839 B1 | 12/2017 |
| FR | 2961172 A1 | 12/2011 |

OTHER PUBLICATIONS

Great Britain search report dated Jul. 17, 2023, issued in GB Patent Application No. 2301053.1.

* cited by examiner

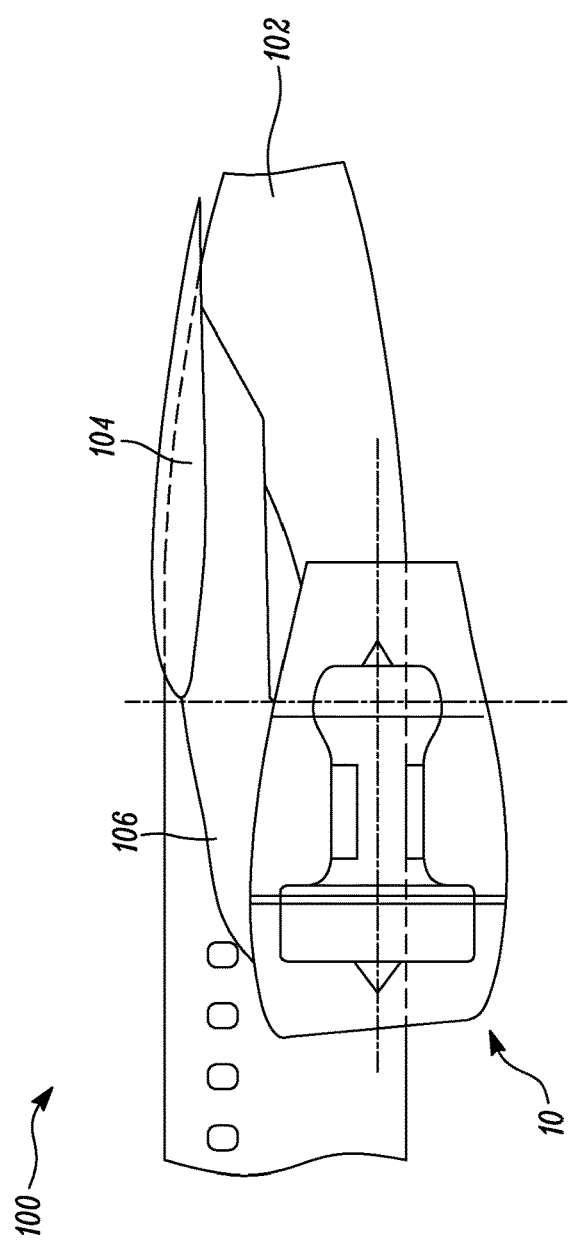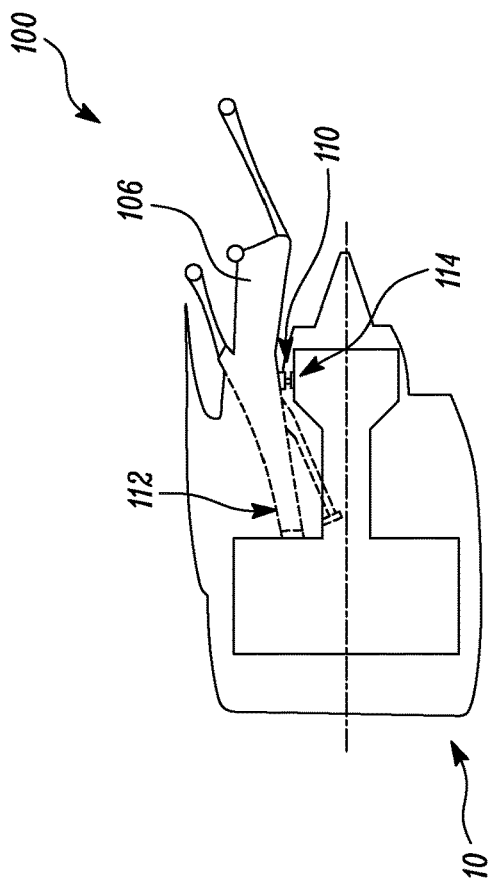

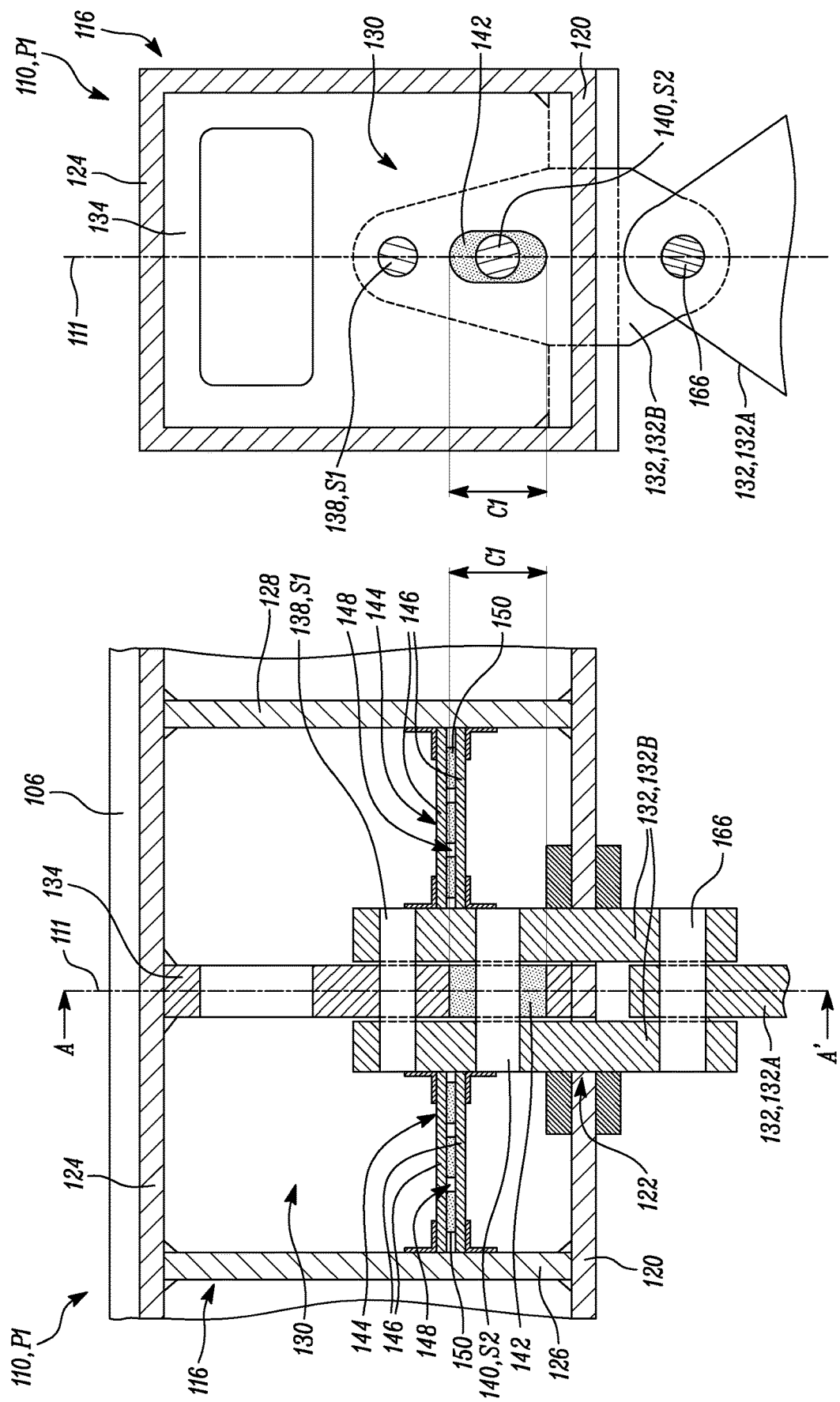

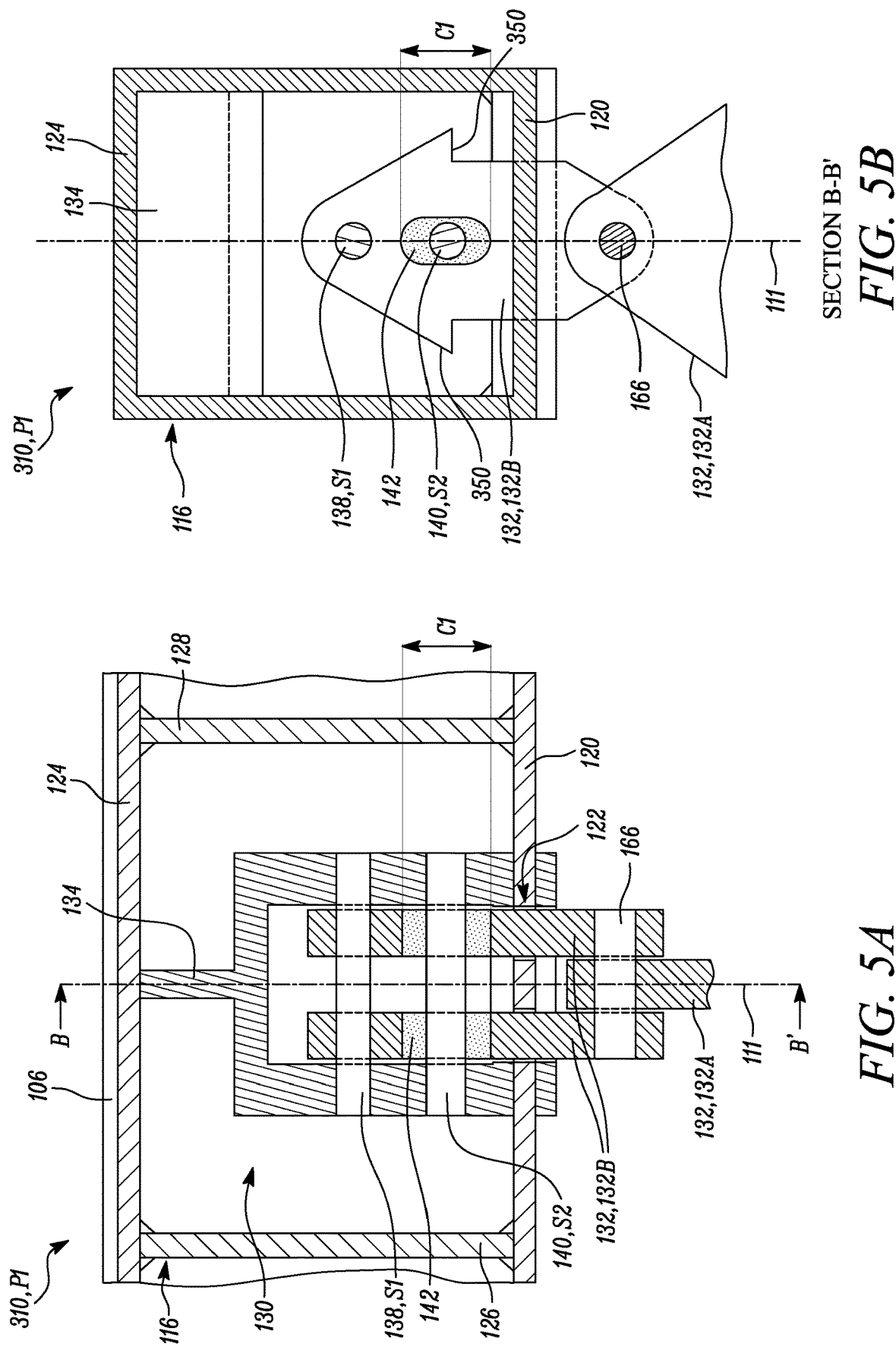

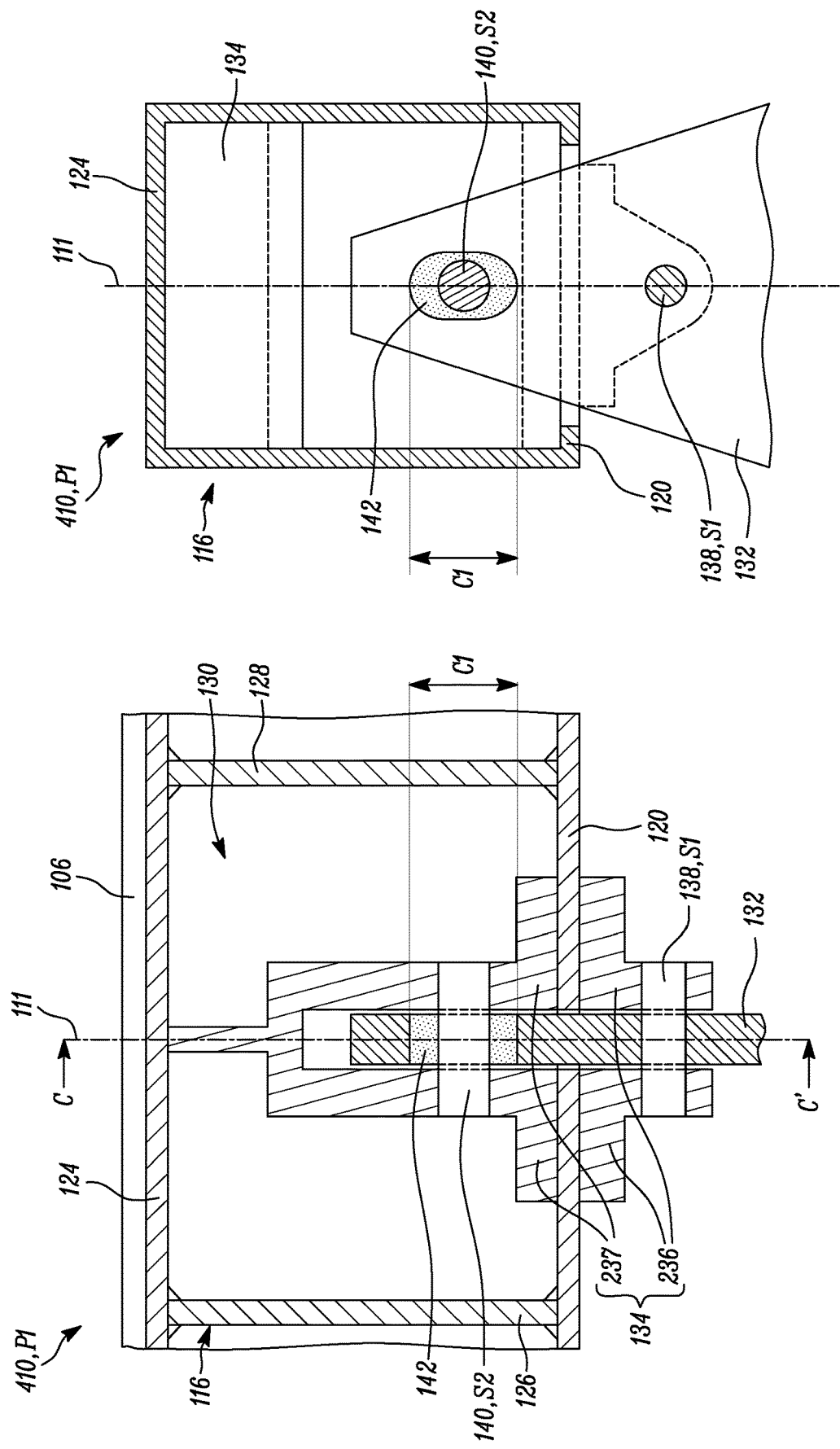

FUSIBLE MOUNTING ASSEMBLY FOR GAS TURBINE ENGINE

CROSS-REFERENCE TO RELATED APPLICATIONS

This specification is based upon and claims the benefit of priority from United Kingdom patent application number GB 2301053.1 filed on Jan. 25, 2023, the entire contents of which is incorporated herein by reference.

BACKGROUND

Technical Field

The present disclosure relates to a mounting assembly for securing a gas turbine engine of an aircraft, and more particularly, relates to a mounting assembly for securing the gas turbine engine to a pylon of the aircraft.

Description of the Related Art

A number of mounting assemblies are used nowadays to mount gas turbine engines to an aircraft via a pylon. The mounting assemblies are used to support the gas turbine engine and for coupling the gas turbine engine to the pylon. The mounting assemblies generally support the gas turbine engine vertically, laterally, and axially, and allow transmission of a variety of static and dynamic loads between the gas turbine engine and the aircraft via the pylon.

The mounting assemblies coupled to the gas turbine engine may further experience other loads, such as thrust loads, torque loads, etc. For example, a failure event such as a fan blade or a turbine blade breaking within the gas turbine engine that may lead to severe unbalances of the gas turbine engine and may further lead to engine vibrations.

It would be desirable to reduce adverse effects of severe unbalances of the gas turbine engine on the aircraft and to isolate the engine vibrations that may be caused due to a failure event.

SUMMARY

According to a first aspect, there is provided a mounting assembly for securing a gas turbine engine to a pylon. The mounting assembly includes an engine mount link extending from the gas turbine engine towards the pylon along a first axis. The mounting assembly further includes an engine mount block connected to the pylon and the engine mount link. The mounting assembly further includes a fusible component connected to the engine mount block. The fusible component has a first shear strength. The mounting assembly further includes a catcher component connected to the engine mount block and disposed within a catcher aperture defined within at least one of the engine mount link, the engine mount block, and the fusible component. The catcher component has a second shear strength greater than the first shear strength of the fusible component. In a first state of the mounting assembly, when an applied shear stress on the fusible component is less than the first shear strength of the fusible component, the engine mount link is stationary with respect to the engine mount block. In a second state of the mounting assembly, when the applied shear stress on the fusible component exceeds the first shear strength of the fusible component, the fusible component mechanically fails and causes the catcher component to move relative to the catcher aperture. A movement of the catcher component relative to the catcher aperture causes a corresponding movement of the engine mount link with respect to the engine mount block along the first axis.

A magnitude of the movement of the catcher component and indeed the engine may therefore be limited, as desired, by appropriately sizing the catcher aperture. Further, in some cases, the catcher component may directly or indirectly engage the engine mount link or the engine mount block to prevent detachment and minimise movement of the gas turbine engine from the pylon.

The root cause of the movement of the catcher component relative to the catcher aperture is the unbalance load in the gas turbine or any gravity/inertia loading on the gas turbine. The catcher component moves relative to the catcher aperture because it is connected to the second engine mount link, which in turn is connected to the first engine mount link, which in turn is connected to the gas turbine engine.

In the second state of the mounting assembly, i.e., in case of a failure event (such as, a Fan Blade Off event or a Core Blade Off event), which may cause the applied shear stress on the fusible component to exceed the first shear strength of the fusible component, the mounting assembly may limit peak transient dynamic loads between the gas turbine engine and the pylon along the first axis. In the second state of the mounting assembly, the mounting assembly may provide a nonlinear stiffness characteristic between the gas turbine engine and the pylon along the first axis. Specifically, in the second state of the mounting assembly, the mounting assembly may limit the peak transient dynamic loads and isolate engine vibrations caused due to the failure event by allowing the movement of the catcher component relative to the catcher aperture which causes or allows the corresponding movement of the engine mount link with respect to the engine mount block along the first axis. This may further cause or allow a relative movement between the gas turbine engine and the pylon along the first axis. Therefore, the mounting assembly may effectively reduce the adverse effects of the engine unbalances on an aircraft which may be transmitted via the pylon, thereby enhancing robustness to the failure event.

In addition, the nonlinear stiffness characteristic between the gas turbine engine and the pylon along the first axis due to the mounting assembly in the second state may also help to change a natural frequency of a resonant mode of the failure event. For example, there tends to be a reduction of natural frequency when the fusible pin fails. If the relative movement is high enough to cause contact between catcher pin and mount block, the frequency of the same mode tends to increase from the lower value it got to when the fusible pin failed.

Further, the peak transient dynamic loads from the gas turbine engine to the pylon and subsequently the aircraft along the first axis may be limited and controlled based on design parameters (e.g., the first shear strength, the catcher aperture, etc.) at a location of the mounting assembly.

Conventionally, the gas turbine engine components are sized at least to withstand loads that are caused by a failure event. Since the peak transient dynamic loads between the gas turbine engine and the pylon are limited and controlled by the mounting assembly of the present disclosure, other components within the gas turbine engine where the dynamic load is being reacted may have a reduced mass, whilst still allowing the gas turbine engine to withstand the peak transient dynamic loads that are caused by a failure event. Therefore, the gas turbine engine may have a reduced weight and a reduced cost, which in turn provides improvements to the fuel burn performance of the aircraft fitted with them.

Moreover, the mounting assembly may be adapted to different gas turbine engines. For example, the components (i.e., the fusible component, the catcher component, etc.) of the mounting assembly may be adapted to gas turbine engines with varying space constraints, load requirements, and heat environments.

Typically, gas turbine engines and the nacelles of gas turbine engines have a substantial influence on both natural frequency and amplitude of the resonant mode of the failure event. Therefore, manufacturers of gas turbine engines and their nacelles may be required to work together to optimise and obtain an integrated solution. However, since the peak transient dynamic loads between the gas turbine engine and the pylon are limited and controlled by the mounting assembly of the present disclosure, the manufacturers of the gas turbine engines and the nacelles can have the freedom to work more independently as a result.

In some embodiments, the fusible component is spaced apart from the catcher component along the first axis. The fusible component spaced apart from the catcher component along the first axis may include a fusible pin. The fusible pin may be easier to design and manufacture. This may further provide a designer of the mounting assembly with more design options for the fusible component.

In some embodiments, the catcher component is disposed between the fusible component and the gas turbine engine with respect to the first axis.

In some other embodiments, the fusible component is disposed between the catcher component and the gas turbine engine with respect to the first axis.

Therefore, the location of the fusible component and the catcher component can be varied according to desired design and application attributes. This may further provide the designer of the mounting assembly with more design options for placement of the fusible component and the catcher component.

In some embodiments, the fusible component at least partially surrounds the catcher component about a second axis orthogonal to the first axis. The mounting assembly having the fusible component at least partially surrounding the catcher component about the second axis may have a more compact arrangement. This may further provide the designer of the mounting assembly with more design options for the mounting assembly.

In some embodiments, the catcher aperture is defined within the fusible component. Further, the catcher aperture has an oblong shape, such that a major axis of the oblong shape is along the first axis. Therefore, in the second state of the mounting assembly, the mounting assembly may further resist lateral loads and may prevent lateral load reactions from being redistributed to the rest of the mounting assembly.

In some embodiments, the fusible component includes a plurality of spokes. Each of the plurality of spokes extends between the engine mount block and the catcher component. Each of the plurality of spokes is inclined relative to the first axis.

In some embodiments, in the second state of the mounting assembly, each of the plurality of spokes plastically deforms, causing the catcher component to move relative to the catcher aperture along the first axis. The plurality of spokes of the fusible component may provide additional vibration damping as well as shock load reduction.

In some embodiments, the engine mount block includes a pair of bushings disposed on opposite sides of the engine mount link, each of the pair of bushings at least partially surrounding the catcher component about a second axis orthogonal to the first axis. Further, the fusible component includes a pair of radial spigots corresponding to the pair of bushings. Each of the pair of radial spigots is at least partially disposed between a corresponding bushing from the pair of bushings and the engine mount block. Moreover, in the second state of the mounting assembly, at least one of the pair of radial spigots mechanically fails causing the catcher component to move relative to the catcher aperture. The engine mount block including the pair of bushings disposed on opposite sides of the engine mount link may allow the engine mount block to include low strength materials. Instead, only the pair of bushings may include a material having a greater strength than the engine mount block. This may reduce cost and weight of the mounting assembly. This may further provide the designer of the mounting assembly with more material options as well as design options for the engine mount block.

In some embodiments, the mounting assembly further includes a pylon box including a bottom wall proximal to the gas turbine engine and including a bottom opening therethrough, a top wall opposite to the bottom wall, a first side wall extending between the bottom wall and the top wall along the first axis, and a second side wall opposite to the first side wall and extending between the bottom wall and the top wall along the first axis. The first side wall, the second side wall, the bottom wall, and the top wall together define a pylon cavity therebetween. The engine mount link is at least partially disposed in the pylon cavity and extends from the bottom wall of the pylon box through the bottom opening.

The pylon box may be able to withstand high loads, such as side-to-side loads that may be experienced by the mounting assembly during the operation of the gas turbine engine. Further, the pylon box may protect one or more components (e.g., the energy absorbing material) of the mounting assembly disposed in the pylon cavity from temperature extremes surrounding the gas turbine engine that may otherwise damage the one or more components.

In some embodiments, the engine mount link includes a first engine mount link and a second engine mount link connected to the first engine mount link. The second engine mount link at least partially surrounds the first engine mount link.

In some embodiments, the first engine mount link and the second engine mount link are integrally formed.

In some embodiments, the first engine mount link and the second engine mount link are connected to each other via a mounting pin.

Therefore, the engine mount link may also include a two-part configuration or may be integrally formed. The two parts may be connected via any suitable attachment mechanism. This may provide the designer of the mounting assembly with more design options for the engine mount link.

In some embodiments, the catcher component is integrally formed with the second engine mount link. This may provide the designer of the mounting assembly with more design options for the catcher component.

In some embodiments, the mounting assembly further includes at least one isolator plate connected to at least one of the first and second side walls of the of the pylon box and the second engine mount link. In the second state of the mounting assembly, the at least one isolator plate deforms at least partially along the first axis to allow the catcher component to move relative to the catcher aperture.

The at least one isolator plate may provide suitable stiffness in the mounting assembly along the first axis in the second state of the mounting assembly. Further, the at least one isolator plate may be designed to adjust the stiffness of the mounting assembly in the second state. This may also help to tune a resonance frequency of the gas turbine engine, pylon, nacelle and/or mounting assembly in the second state to a desired value.

In some embodiments, the at least one isolator plate includes a pair of plates spaced apart from each other and defining a cavity therebetween. The at least one isolator plate may further include an isolator plate energy absorbing material disposed in at least a portion of the cavity. The isolator plate energy absorbing material disposed in at least the portion of the cavity may provide additional dampening of the engine vibrations that may be caused due to the failure event.

In some embodiments, when the fusible component mechanically fails and causes the catcher component to move relative to the catcher aperture, the catcher component engages the engine mount link or the engine mount block.

In some embodiments, the mounting assembly further includes an energy absorbing material disposed in at least a portion of the catcher aperture.

In some embodiments, when the fusible component mechanically fails and causes the catcher component to move relative to the catcher aperture, the catcher component deforms the energy absorbing material.

The energy absorbing material disposed in the catcher aperture may provide additional vibration damping as well as shock load reduction. The energy absorbing material may further attenuate an initial shock load, i.e., when the fusible component mechanically fails. The energy absorbing material may also attenuate multiple impacts between the engine mount link/the engine mount block and the catcher component due to the movement of the catcher component relative to the catcher aperture. The energy absorbing material may further prevent a dynamic amplification of the resonant mode of the failure event.

In some embodiments, the engine mount block includes a first engine mount block and a second engine mount block connected to the pylon box. Further, the fusible component is connected to the first engine mount block and the catcher component is connected to the second engine mount block.

In some embodiments, the first engine mount block is connected to the top wall of the pylon box and the second engine mount block is connected to the bottom wall of the pylon box.

In some embodiments, the first engine mount block is connected to the bottom wall of the pylon box proximal to the gas turbine engine and the second engine mount block is connected to the bottom wall of the pylon box opposite to the first engine mount block.

Therefore, manufacturers of the mounting assembly may have multiple design options for implementing the engine mount block of the mounting assembly.

In some embodiments, the engine mount link further includes at least one catcher feature extending perpendicular to the first axis. When the catcher component mechanically fails, the at least one catcher feature engages with at least a portion of the bottom wall to prevent detachment of the gas turbine engine from the pylon.

In some embodiments, the second shear strength is greater than the first shear strength by at least 10%. Such a difference in shear strengths allows the catcher component to withstand a large range of peak transient dynamic loads whilst preventing detachment of the gas turbine engine from the pylon.

In the first state of the mounting assembly, the fusible component partially defines a first load path between the gas turbine engine and the pylon, and the catcher component is not disposed in the first load path between the gas turbine engine and the pylon. Further, in the second state of the mounting assembly, the catcher component partially defines a second load path between the gas turbine engine and the pylon. The second load path is different from the first load path. Therefore, in the second state of the mounting assembly, the catcher component partially defining the second load path between the gas turbine engine and the pylon may prevent detachment of the gas turbine engine from the pylon.

In a second aspect, there is provided an aircraft. The aircraft includes a fuselage and a wing extending from the fuselage. The aircraft further includes a pylon attached to the wing. The aircraft further includes a gas turbine engine. The aircraft further includes the mounting assembly of the first aspect. The mounting assembly secures the gas turbine engine to the pylon.

BRIEF DESCRIPTION OF THE DRAWINGS

Embodiments will now be described by way of example only, with reference to the Figures, in which:

FIG. 2A is a partial schematic side view of an aircraft, according to an embodiment of the present disclosure;

FIG. 2B is a schematic side view of the aircraft of FIG. 2A with some components not shown;

FIG. 3A is a schematic sectional front view of a mounting assembly in a first state, according to an embodiment of the present disclosure;

FIG. 3B is a schematic sectional side view of the mounting assembly along a section line A-A' of FIG. 3A in the first state;

FIG. 5A is a schematic sectional front view of a mounting assembly in the first state, according to another embodiment of the present disclosure;

FIG. 5B is a schematic sectional side view of the mounting assembly along a section line B-B' of FIG. 5A in the first state;

FIG. 6A is a schematic sectional front view of a mounting assembly in the first state, according to another embodiment of the present disclosure;

FIG. 6B is a schematic sectional side view of the mounting assembly along a section line C-C' of FIG. 6A in the first state;

DETAILED DESCRIPTION

Aspects and embodiments of the present disclosure will now be discussed with reference to the accompanying Figures. Further aspects and embodiments will be apparent to those skilled in the art.

Figure 1:
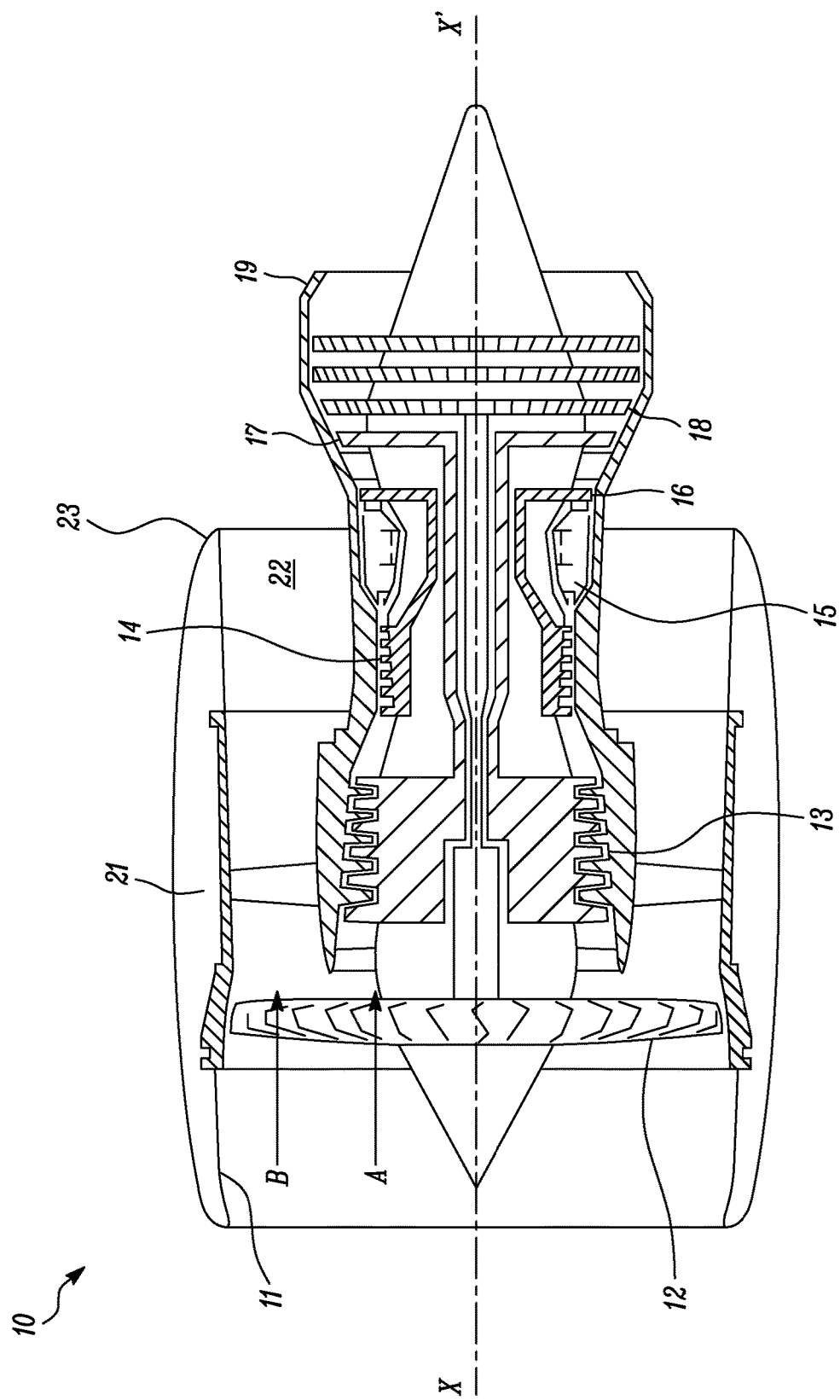
FIG. 1 is a schematic sectional side view of a gas turbine engine.

With reference to FIG. 1, FIG. 1 shows a schematic sectional side view of a gas turbine engine 10 having a principal and rotational axis X-X'. The gas turbine engine 10 includes, in axial flow series, an air intake 11, a compressive fan 12 (which may also be referred to as a low-pressure compressor), an intermediate pressure compressor 13, a high-pressure compressor 14, combustion equipment 15, a high-pressure turbine 16, an intermediate pressure turbine 17, a low-pressure turbine 18, and a core exhaust nozzle 19. A nacelle 21 generally surrounds the gas turbine engine 10 and defines the air intake 11, a bypass duct 22 and a bypass exhaust nozzle 23. The gas turbine engine 10 works in a conventional manner so that the air entering the air intake 11 is accelerated by the compressive fan 12 to produce two air flows; a first air flow A into the intermediate pressure compressor 13 and a second air flow B which passes through the bypass duct 22 to provide a propulsive thrust. The intermediate pressure compressor 13 compresses the first air flow A directed into it before delivering that air to the high-pressure compressor 14 where further compression takes place. The compressed air exhausted from the high-pressure compressor 14 is directed into the combustion equipment 15 where it is mixed with fuel and the mixture combusted. The resulting hot combustion products then expand through, and thereby drive the high, intermediate, and low-pressure turbines 16, 17, 18 before being exhausted through the core exhaust nozzle 19 to provide additional propulsive thrust. The high, intermediate, and low-pressure turbines 16, 17, 18 respectively drive the high and intermediate pressure compressors, 14, 13, and the compressive fan 12 by suitable interconnecting shafts.

FIG. 2A shows a partial schematic side view of an aircraft 100, according to an embodiment of the present disclosure. The aircraft 100 includes a fuselage 102 and a wing 104 extending from the fuselage 102. The aircraft 100 further includes a pylon 106 attached to the wing 104. The aircraft 100 further includes the gas turbine engine 10. The pylon 106 allows thrust forces developed by the gas turbine engine 10 to be transmitted to the aircraft 100. Whilst the described example relates to the gas turbine engine 10, the disclosure may apply, for example, to any type of turbofan engine or gas turbine engine, such as an open rotor (in which the fan stage is not surrounded by a nacelle) or turboprop engine, or to a geared gas turbine engine, such as a turbofan engine, for example. The disclosure is also equally applicable to an electric engine for an aircraft.

FIG. 2B shows a schematic side view of the aircraft 100. Some components (i.e., the fuselage 102 and the wing 104) of the aircraft 100 are not shown for the purpose of illustration. The aircraft 100 further includes a mounting assembly 110. The mounting assembly 110 is provided in order to mount the gas turbine engine 10 to the pylon 106. The mounting assembly 110 secures the gas turbine engine 10 to the pylon 106. In some embodiments, the gas turbine engine 10 includes a front interface portion 112 and a rear interface portion 114 for securing the gas turbine engine 10 to the pylon 106. In some embodiments, the mounting assembly 110 secures the rear interface portion 114 of the gas turbine engine 10 to the pylon 106, as a vibration load transmissibility may be higher at the rear interface portion 114 of the gas turbine engine 10 in comparison to other locations of the gas turbine engine 10 (e.g., the front interface portion 112). However, in some other embodiments, the mounting assembly 110 may secure the front interface portion 112 of the gas turbine engine 10 to the pylon 106.

Alternatively, the mounting assembly 110 may be provided in order to mount an electric engine to the pylon 106. The mounting assembly 110 secures the electric engine to the pylon 106. In some embodiments, the electric engine includes a front interface portion and a rear interface portion for securing the electric engine to the pylon 106. In some embodiments, the mounting assembly 110 secures the rear interface portion of the electric engine to the pylon 106, as a vibration load transmissibility due to components of the electric engine may be higher at the rear interface portion of the electric engine in comparison to other locations of the electric engine (e.g., the front interface portion). However, in some other embodiments, the mounting assembly 110 may secure the front interface portion of the electric engine to the pylon 106.

Figure 3C:
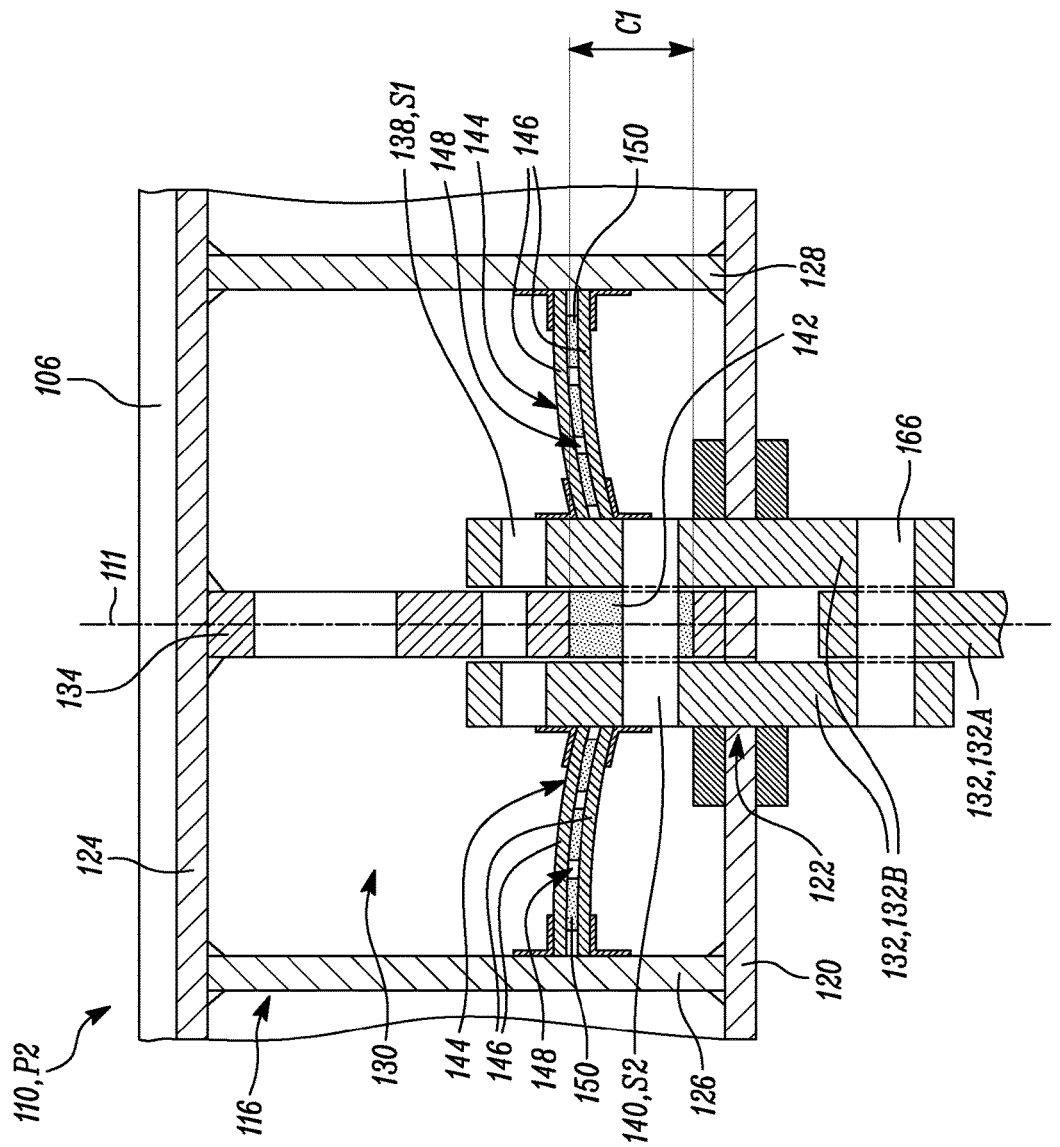
FIG. 3C is a schematic sectional front view of the mounting assembly of FIG. 3A in a second state.

FIG. 3A shows a schematic sectional front view of the mounting assembly 110 for securing the gas turbine engine 10 (shown in FIG. 2A and FIG. 2B) to the pylon 106, according to an embodiment of present disclosure. FIG. 3B is a schematic sectional side view of the mounting assembly 110 shown in FIG. 3A taken along a section line A-A' shown in FIG. 3A. Specifically, FIG. 3A and FIG. 3B illustrate the mounting assembly 110 in a first state P1. FIG. 3C is a schematic sectional front view of the mounting assembly 110 in a second state P2.

With reference to FIGS. 3A to 3C, the mounting assembly 110 includes an engine mount link 132 extending from the gas turbine engine 10 (shown in FIGS. 2A-2B) towards the pylon 106 along a first axis 111. The engine mount link 132 may be fixedly connected to the gas turbine engine 10.

In the illustrated embodiment of FIGS. 3A to 3C, the engine mount link 132 includes a first engine mount link 132A and a second engine mount link 132B connected to the first engine mount link 132A. In the illustrated embodiment of FIGS. 3A to 3C, the second engine mount link 132B at least partially surrounds the first engine mount link 132A.

In some other embodiments, the first engine mount link 132A and the second engine mount link 132B are integrally formed. In some other embodiments, such as the exemplary embodiment shown in FIGS. 3A to 3C, the first engine mount link 132A and the second engine mount link 132B are connected to each other via a mounting pin 166. In some embodiments, the mounting pin 166 may be made of a metallic material, composite material, a polymeric material, or a combination thereof. In some other embodiments, the first engine mount link 132A and the second engine mount link 132B may be connected to each other via any suitable attachment mechanism, as per desired application attributes.

The mounting assembly 110 further includes an engine mount block 134 connected to the pylon 106 and the engine mount link 132.

The mounting assembly 110 further includes a fusible component 138 connected to the engine mount block 134. In the illustrated embodiment of FIG. 3A, the fusible component 138 is a fusible pin. The fusible component 138 has a first shear strength S1. In some embodiments, the fusible component 138 may be made of a metallic material, a polymeric material, a composite material, or a combination thereof.

The mounting assembly 110 in the illustrated embodiment of FIGS. 3A-3C further includes a catcher component 140 connected to the engine mount block 134 and disposed within a catcher aperture C1 defined within the engine mount block 134.

In alternative examples of the present invention, the catcher component 140 is connected to the engine mount block 134 and is disposed within the catcher aperture C1 defined within at least one of the engine mount link 132, the engine mount block 134, and the fusible component 138. In some embodiments, the catcher aperture C1 has an elliptical shape, such that a major axis of the elliptical shape is along the first axis 111, but a variety of shapes, for example an oblong shape, could be used, providing there is relative clearance along the first axis 111.

The catcher component 140 has a second shear strength S2 greater than the first shear strength S1 of the fusible component 138. In some embodiments, the second shear strength S2 may be greater than the first shear strength S1 by at least 10%, 15%, 20%, 25%, 30%, 35%, 40%, 45%, or 50%. In some embodiments, the second shear strength S2 may be greater than the first shear strength S1 by at least 100%. In some embodiments, the second shear strength S2 may be greater than the first shear strength S1 by at least 200%, 300%, 400%, or 500%. In some embodiments, the catcher component 140 may be made of a metallic material, a polymeric material, a composite material, or a combination thereof.

In some embodiments, the material of the fusible component 138 may be different from the material of the catcher component 140. In some other embodiments, the material of the fusible component 138 may be substantially similar to the material of the catcher component 140. In cases where the material of the fusible component is substantially similar to the material of the catcher component, the dimensions (e.g., diameters or thicknesses) of the fusible component 138 and the catcher component 140 will be different, such that the second shear strength S2 of the catcher component 140 is greater than the first shear strength S1 of the fusible component 138.

In the illustrated embodiment of FIG. 3A, the energy absorbing material 142 is disposed within the catcher aperture C1 defined within the engine mount block 134. In other illustrated embodiments, the mounting assembly 110 further includes an energy absorbing material 142 disposed in at least a portion of the catcher aperture C1. The skilled person will understand that whilst the energy-absorbing material improves the ability of the disclosed mounting assembly to absorb energy, it is not an essential feature. In embodiments of the present disclosure where the mounting assembly does not include energy-absorbing material, the ability of the engine mount link 132 to move with respect to the engine mount block 134 if the fusible component 138 fails still provides a nonlinear stiffness characteristic between the gas turbine engine and the pylon along the first axis, which will also help to reduce a natural frequency of a resonant mode of the gas turbine engine or indeed the whole powerplant assembly after the failure event.

In some embodiments, the energy absorbing material 142 may include fibre composites, foams, magneto-rheological (MR) fluids, porous materials, or a combination thereof. In some embodiments, the energy absorbing material 142 may include any other suitable materials.

In the illustrated embodiment of FIGS. 3A-3C, the fusible component 138 is spaced apart from the catcher component 140 along the first axis 111. Specifically, the catcher component 140 is disposed between the fusible component 138 and the gas turbine engine 10 (shown in FIGS. 2A and 2B) with respect to the first axis 111.

In some embodiments, the mounting assembly 110 further includes a pylon box 116 including a bottom wall 120 proximal to the gas turbine engine 10. The bottom wall 120 includes a bottom opening 122 therethrough. The pylon box 116 further includes a top wall 124 opposite to the bottom wall 120. The pylon box 116 further includes a first side wall 126 extending between the bottom wall 120 and the top wall 124 along the first axis 111. The pylon box 116 further includes a second side wall 128 opposite to the first side wall 126 and extending between the bottom wall 120 and the top wall 124 along the first axis 111. The first side wall 126, the second side wall 128, the bottom wall 120, and the top wall 124 together define a pylon cavity 130 therebetween. The engine mount link 132 is at least partially disposed in the pylon cavity 130 and extends from the bottom wall 120 of the pylon box 116 through the bottom opening 122. The skilled person will understand this is not an essential feature, and that various embodiments of the present disclosure can function so long as the engine mount block 134 is attachable to the pylon 106.

In the illustrated embodiment of FIGS. 3A-3C, the engine mount block 134 is connected to the pylon box 116. Specifically, the engine mount block 134 is connected to the top wall 124 and the bottom wall 120 of the pylon box 116. Further, the second engine mount link 132B of the engine mount link 132 is at least partially disposed in the pylon cavity 130 and extends from the bottom wall 120 of the pylon box 116 through the bottom opening 122.

In some embodiments, the mounting assembly 110 further includes at least one isolator plate 144 connected to at least one of the first and second side walls 126, 128 of the pylon box 116 and the engine mount link 132. Specifically, in some embodiments, the at least one isolator plate 144 is connected to at least one of the first and second side walls 126, 128 of the pylon box 116 and the second engine mount link 132B. In the illustrated embodiment of FIG. 3A, the at least one isolator plate 144 includes two isolator plates. One of the two isolator plates is connected to the first side wall 126 of the pylon box 116 and the second engine mount link 132B and the other of the two isolator plates is connected to the second side wall 128 of the of the pylon box 116 and the second engine mount link 132B.

In some embodiments the isolator plates may be fitted to the pylon side walls shown in FIG. 3B instead of the side walls 126 and 128 shown in FIG. 3A.

It will be apparent to the skilled person that whilst the exemplary embodiments shown in FIGS. 3 and 4 are shown with isolator plates, they are not essential parts of the configuration, and that the same embodiments will also provide useful functionality in the absence of isolator plates, as shown in the exemplary embodiments of FIGS. 5 and 6, for example.

In some embodiments, the at least one isolator plate 144 includes a pair of plates 146 spaced apart from each other and defining a cavity 148 therebetween. In some embodiments, the at least one isolator plate 144 further includes an isolator plate energy absorbing material 150 disposed in at least a portion of the cavity 148. The isolator plate energy absorbing material 150 may be substantially similar to the energy absorbing material 142 or may be different from the energy absorbing material 142. In some embodiments, the pair of plates 146 may be made of a metallic material, a polymeric material, or a combination thereof. In some embodiments there is no cavity so the stacked plates can contact each other, thus enabling energy absorption through friction.

It will be apparent to the skilled person that whilst the exemplary embodiments shown in FIGS. 3 and 4 are shown with isolator plate energy absorbing material, this is not an essential feature of the isolator plates, which can still provide useful energy absorption without the inclusion of isolator plate energy absorbing material.

As is apparent from FIGS. 3A and 3B, in the first state P1 of the mounting assembly 110, when an applied shear stress τ on the fusible component 138 is less than the first shear strength S1 of the fusible component 138, the engine mount link 132 is stationary with respect to the engine mount block 134. Specifically, in the first state P1 of the mounting assembly 110, when the applied shear stress τ on the fusible component 138 is less than the first shear strength S1 of the fusible component 138, the first and second engine mount links 132A, 132B are stationary with respect to the engine mount block 134, as the connections between the engine mount link 132, the fusible component 138, and the engine mount block 134 are fixed with respect to the first axis 111.

However, as is apparent from FIG. 3C, in the second state P2 of the mounting assembly 110, when the applied shear stress τ on the fusible component 138 exceeds the first shear strength S1 of the fusible component 138, the fusible component 138 mechanically fails and causes the catcher component 140 to move relative to the catcher aperture C1. When the fusible component 138 mechanically fails and causes the catcher component 140 to move relative to the catcher aperture C1, the catcher component 140 engages the engine mount link 132 or the engine mount block 134. When the fusible component 138 mechanically fails and causes the catcher component 140 to move relative to the catcher aperture C1, the catcher component 140 may directly or indirectly engage the engine mount link 132 or the engine mount block 134.

In the illustrated embodiment of FIG. 3C, when the fusible component 138 mechanically fails and causes the catcher component 140 to move relative to the catcher aperture C1, the catcher component 140 transfers energy to the energy absorbing material 142 by deforming it. Therefore, in the illustrated embodiment of FIG. 3C, when the fusible component 138 mechanically fails and causes the catcher component 140 to move relative to the catcher aperture C1, the catcher component 140 indirectly engages the engine mount block 134 via the energy-absorbing material within the aperture C1 within the engine mount block 134.

A movement of the catcher component 140 relative to the catcher aperture C1 causes a corresponding movement of the engine mount link 132 with respect to the engine mount block 134 along the first axis 111. A magnitude of the movement of the catcher component may therefore be limited, as desired, by appropriately sizing the catcher aperture C1. Further, in some cases, the catcher component 140 may directly or indirectly engage the engine mount link 132 or the engine mount block 134 to prevent detachment of the gas turbine engine 10 from the pylon 106.

Specifically, in the illustrated embodiment of FIGS. 3A-3C, the movement of the catcher component 140 relative to the catcher aperture C1 causes the corresponding movement of the first engine mount link 132A and the second engine mount link 132B with respect to the engine mount block 134 along the first axis 111. Further, the catcher component 140 indirectly engages the engine mount block 134 to prevent detachment of the gas turbine engine 10 from the pylon 106.

In the second state P2 of the mounting assembly 110, i.e., in case of a failure event (such as a Fan Blade Off event or a Core Blade Off event), which may cause the applied shear stress τ on the fusible component 138 to exceed the first shear strength S1 of the fusible component 138, the mounting assembly 110 may limit peak transient dynamic loads between the gas turbine engine 10 and the pylon 106 along the first axis 111. In the second state P2 of the mounting assembly 110, the mounting assembly 110 may provide a nonlinear stiffness characteristic between the gas turbine engine 10 and the pylon 106 along the first axis 111. Specifically, in the second state P2 of the mounting assembly 110, the mounting assembly 110 may limit the peak transient dynamic loads and isolate engine vibrations caused due to the failure event (e.g. fan blade off or core blade off) by allowing the movement of the catcher component 140 relative to the catcher aperture C1 which causes the corresponding movement of the engine mount link 132 with respect to the engine mount block 134 along the first axis 111. This may further cause a relative movement between the gas turbine engine 10 and the pylon 106 along the first axis 111. Further, in some cases, since the catcher aperture C1 has an oblong shape, in the second state P2 of the mounting assembly 110, the mounting assembly 110 may further resist lateral loads and may prevent lateral load reactions from being redistributed to the rest of the mounting assembly 110.

Therefore, the mounting assembly 110 may effectively reduce the adverse effects of the engine unbalances on the aircraft 100 (shown in FIG. 2A and FIG. 2B) which may be transmitted via the pylon 106, thereby enhancing robustness to the failure event.

In addition, the nonlinear stiffness characteristic between the gas turbine engine 10 and the pylon 106 along the first axis 111 due to the mounting assembly 110 in the second state P2 may also help to reduce a natural frequency of any potential resonance mode excited by the gas turbine rotor unbalance.

Further, the peak transient dynamic loads from the gas turbine engine 10 to the pylon 106 and subsequently the aircraft 100 along the first axis 111 may be limited and controlled based on design parameters (e.g., the first shear strength S1, the catcher aperture C1, etc.) at a location of the mounting assembly 110 (e.g., the rear interface portion 114).

Since the peak transient dynamic loads between the gas turbine engine 10 and the pylon 106 are limited and controlled by the mounting assembly 110, other components of the gas turbine engine 10 may have a smaller mass, whilst still enabling the gas turbine engine 10 to withstand the peak transient dynamic loads that are caused by a failure event. Therefore, the gas turbine engine 10 may have a reduced weight and a reduced cost, which in turn provides improvements to the fuel burn performance of the aircraft fitted with them.

Moreover, the mounting assembly 110 may be adapted to different gas turbine engines. For example, the components (i.e., the fusible component 138, the catcher component 140, etc.) of the mounting assembly 110 may be adapted to the gas turbine engines 10 with varying space constraints, load requirements, and heat environments.

Further, since the peak transient dynamic loads between the gas turbine engine 10 and the pylon 106 are limited and controlled by the mounting assembly 110, manufacturers of the gas turbine engine 10 and the nacelle 21 may work with greater independence when designing the gas turbine engine 10 and the nacelle 21.

Since the catcher component 140 deforms the energy absorbing material 142 when the fusible component 138 mechanically fails and causes the catcher component 140 to move relative to the catcher aperture C1, in embodiment comprising energy absorbing material 142 within the catcher aperture C1, the energy absorbing material 142 disposed in the catcher aperture C1 may provide additional vibration damping as well as shock load reduction. The energy absorbing material 142 may attenuate an initial shock load, i.e., when the fusible component 138 mechanically fails. The energy absorbing material 142 may also attenuate multiple impacts between the catcher component 140 and the engine mount link 132 or the engine mount block 134 due the movement of the catcher component 140 relative to the catcher aperture C1. The energy absorbing material 142 may further prevent a dynamic amplification of the resonant mode of the failure event.

Further, the pylon box 116 may be able to withstand high loads, such as side-to-side loads that may be experienced by the mounting assembly 110 during the operation of the gas turbine engine 10. Further, the pylon box 116 may protect one or more components (e.g., the energy absorbing material 142) of the mounting assembly 110 disposed in the pylon cavity 130 from temperature extremes surrounding the gas turbine engine 10 that may otherwise damage the one or more components.

In some embodiments, in the second state P2 of the mounting assembly 110, the at least one isolator plate 144 deforms at least partially along the first axis 111 to allow the catcher component 140 to move relative to the catcher aperture C1.

The at least one isolator plate 144 may provide suitable stiffness to limit the load going through the engine mount along the first axis 111 in the second state P2 of the mounting assembly 110. Further, the at least one isolator plate 144 may be designed to adjust the stiffness of the mounting assembly 110 in the second state P2. This may also help to tune a resonance frequency of the mounting assembly 110 in the second state P2 to a desired value. In embodiments comprising isolator plate energy absorbing material 150 the isolator plate energy absorbing material 150 disposed in at least the portion of the cavity 148 may provide additional dampening of the engine vibrations that may be caused due to the failure event.

Figures 4A, 4B:
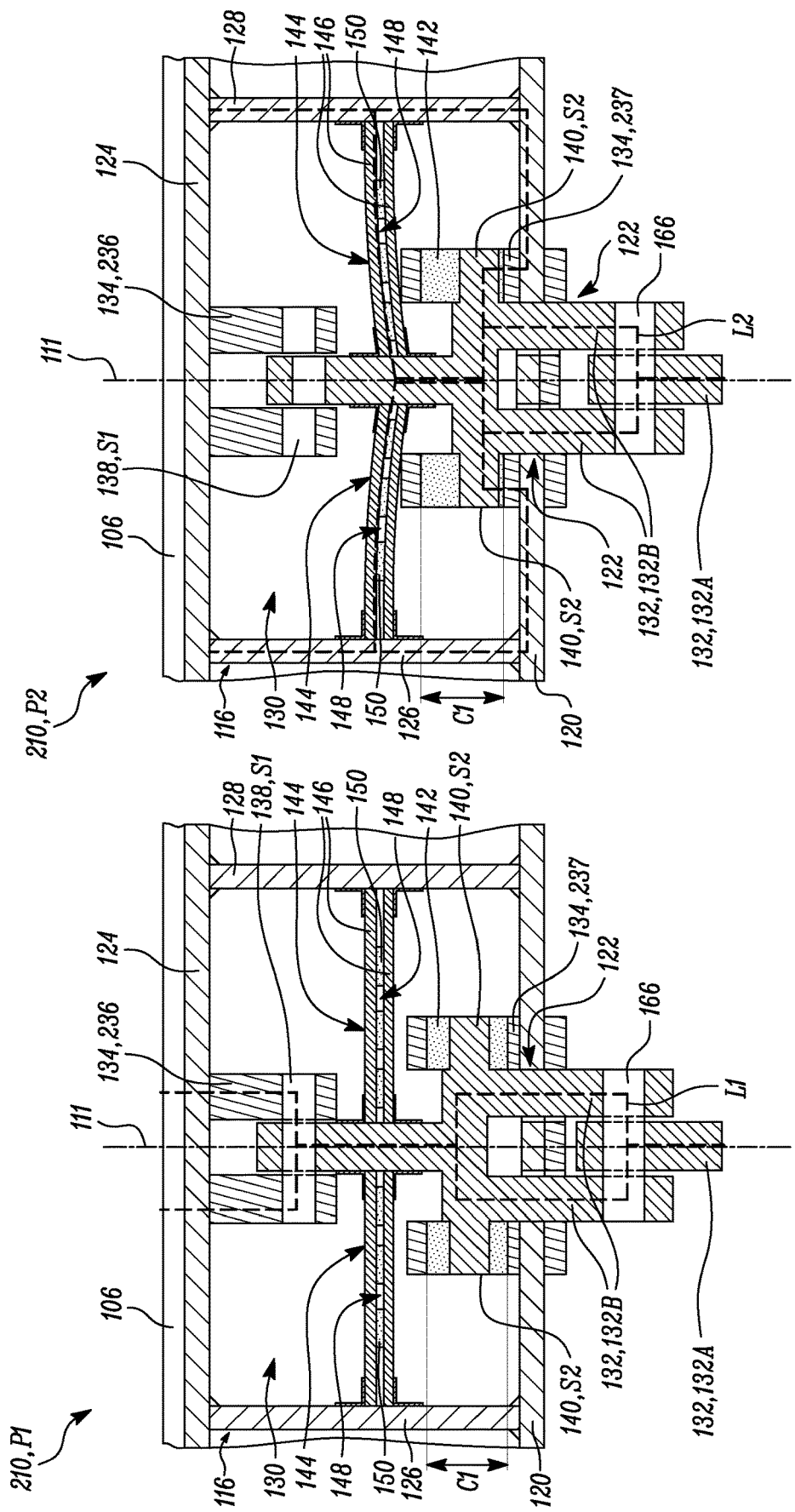
FIG. 4A is a schematic sectional front view of a mounting assembly in the first state, according to another embodiment of the present disclosure.
FIG. 4B is a schematic sectional front view of the mounting assembly of FIG. 4A in the second state.

FIG. 4A shows a schematic sectional front view of a mounting assembly 210, according to another embodiment of present disclosure, in the first state P1. FIG. 4B shows a schematic sectional front view of the mounting assembly 210 of FIG. 4A in the second state P2.

The mounting assembly 210 is substantially similar to the mounting assembly 110, with common components being referred to by the same reference numerals. However, in the illustrated embodiment of FIG. 4A and FIG. 4B, the engine mount block 134 of the mounting assembly 210 includes a first engine mount block 236 and a second engine mount block 237 connected to the pylon box 116. Specifically, the first engine mount block 236 is connected to the top wall 124 of the pylon box 116 and the second engine mount block 237 is connected to the bottom wall 120 of the pylon box 116.

With reference to FIG. 4A and FIG. 4B, the fusible component 138 is connected to the first engine mount block 236. Further, the catcher component 140 is connected to the second engine mount block 237.

In the illustrated embodiment of FIG. 4A and FIG. 4B, the catcher component 140 is integrally formed with the second engine mount link 132B. Further, the catcher aperture C1 is defined within the engine mount block 134. Specifically, the catcher aperture C1 is defined within the second engine mount block 237. Moreover, the first engine mount link 132A and the second engine mount link 132B are connected to each other via a mounting pin 166, as shown in FIGS. 3A to 3C, although it will be understood that the first engine mount link 132A and the second engine mount link 132B could instead be integrally formed.

As is apparent from FIG. 4A, in the first state P1 of the mounting assembly 210, when the applied shear stress τ on the fusible component 138 is less than the first shear strength S1 of the fusible component 138, the engine mount link 132 is stationary with respect to the first and second engine mount blocks 236, 237. Specifically, in the first state P1 of the mounting assembly 210, when the applied shear stress τ on the fusible component 138 is less than the first shear strength S1 of the fusible component 138, the first and second engine mount links 132 are stationary with respect to the first and second engine mount blocks 236, 237.

Further, in the first state P1 of the mounting assembly 210, the fusible component 138 partially defines a first load path L1 between the gas turbine engine 10 (shown in FIGS. 2A and 2B) and the pylon 106 and the catcher component 140 is not disposed in the first load path L1 between the gas turbine engine 10 and the pylon 106.

Further, as is apparent from FIG. 4B, in the second state P2 of the mounting assembly 210, when the applied shear stress τ on the fusible component 138 exceeds the first shear strength S1 of the fusible component 138, the fusible component 138 mechanically fails and causes the catcher component 140 to move relative to the catcher aperture C1. In the illustrated embodiment of FIG. 4B, when the fusible component 138 mechanically fails and causes the catcher component 140 to move relative to the catcher aperture C1, the catcher component 140 indirectly engages the second engine mount block 237 via the energy absorbing material 142 within the catcher aperture C1. The fusible component 138 is the weakest component in the first load path L1 between the gas turbine engine 10 (shown in FIGS. 2A and 2B) and the pylon 106.

The movement of the catcher component 140 relative to the catcher aperture C1 causes the corresponding movement of the engine mount link 132 with respect to the first and second engine mount blocks 236, 237 along the first axis 111. Specifically, the movement of the catcher component 140 relative to the catcher aperture C1 causes the corresponding movement of the first and second engine mount links 132A, 132B with respect to the first and second engine mount blocks 236, 237 along the first axis 111.

Moreover, in the second state P2 of the mounting assembly 210, the catcher component 140 partially defines a second load path L2 between the gas turbine engine 10 and the pylon 106. As is apparent from FIG. 4A and FIG. 4B, the second load path L2 is different from the first load path L1.

Figure 5C:
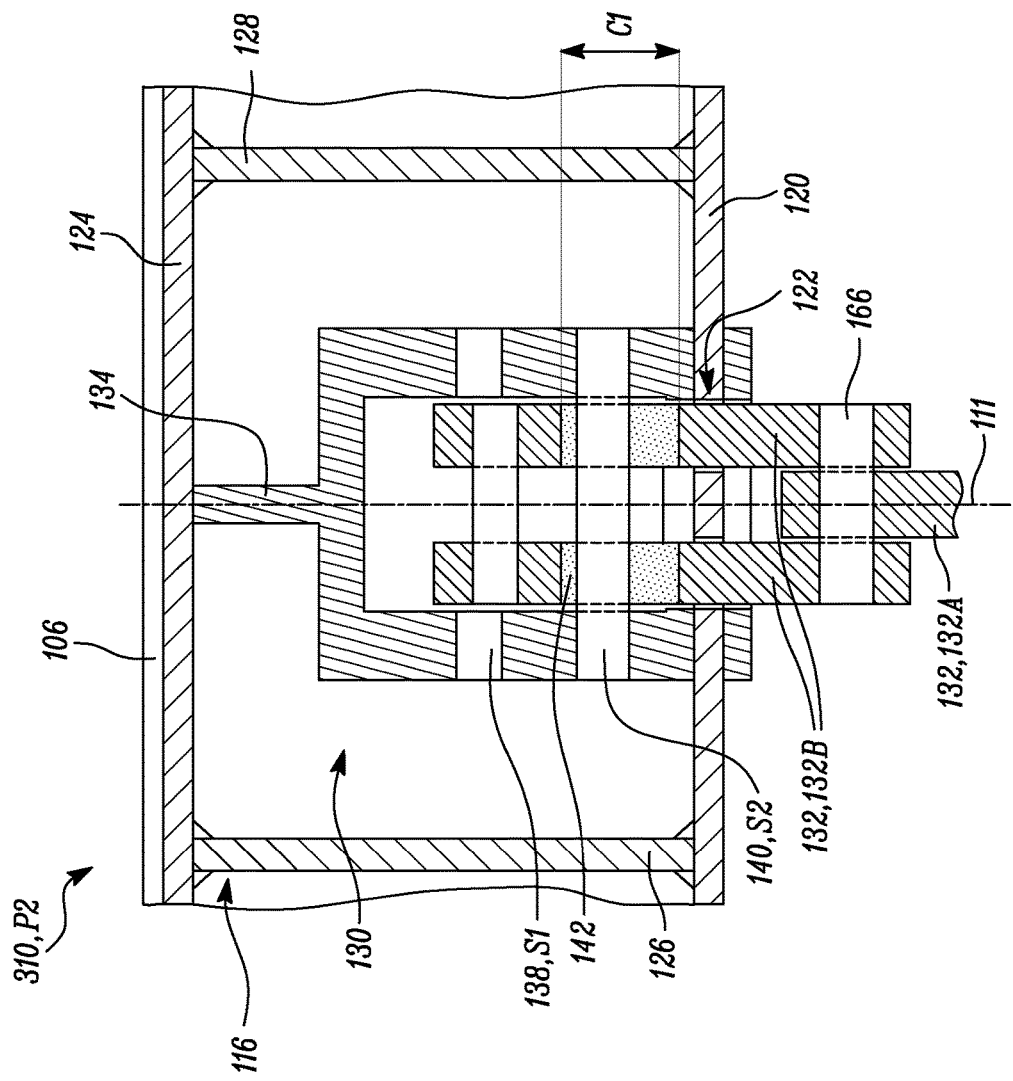
FIG. 5C is a schematic sectional front view of the mounting assembly of FIG. 5A in the second state.

FIG. 5A shows a schematic sectional front view of a mounting assembly 310 for securing the gas turbine engine 10 (shown in FIG. 2A and FIG. 2B) to the pylon 106, according to another embodiment of present disclosure. FIG. 5B is a schematic sectional side view of the mounting assembly 310 shown in FIG. 5A taken along a section line B-B' shown in FIG. 5A. Specifically, FIG. 5A and FIG. 5B illustrate the mounting assembly 310 in the first state P1. FIG. 5C is a schematic sectional front view of the mounting assembly 310 in the second state P2.

The mounting assembly 310 is substantially similar to the mounting assembly 110 shown in FIGS. 3A-3C, with common components being referred to by the same reference numerals. However, in the illustrated embodiment of FIGS. 5A-5C, the engine mount link 132 further includes at least one catcher feature 350 (shown in FIG. 5B) extending perpendicular to the first axis 111. Specifically, the second engine mount link 132B includes the at least one catcher feature 350 extending perpendicular to the first axis 111.

Further, in the illustrated embodiment of FIGS. 5A-5C, the catcher component 140 is connected to the engine mount block 134 and is disposed within the catcher aperture C1 defined within the engine mount link 132. Specifically, in the illustrated embodiment of FIGS. 5A-5C, the catcher aperture C1 is defined within the second engine mount link 132B. Further, the engine mount block 134 is connected to the top wall 124 and the bottom wall 120 of the pylon box 116.

As is apparent from FIG. 5A and FIG. 5B, in the first state P1 of the mounting assembly 310, when the applied shear stress τ on the fusible component 138 is less than the first shear strength S1 of the fusible component 138, the engine mount link 132 is stationary with respect to the engine mount block 134. Specifically, in the first state P1 of the mounting assembly 310, when the applied shear stress τ on the fusible component 138 is less than the first shear strength S1 of the fusible component 138, the first and second engine mount links 132A, 132B are stationary with respect to the engine mount block 134, as the connections between the engine mount link 132, the fusible component 138, and the engine mount block 134 are fixed with respect to the first axis 111.

Further, as is apparent from FIG. 5C, in the second state P2 of the mounting assembly 310, when the applied shear stress τ on the fusible component 138 exceeds the first shear strength S1 of the fusible component 138, the fusible component 138 mechanically fails and causes the catcher component 140 to move relative to the catcher aperture C1.

In the illustrated embodiment of FIG. 5C, when the fusible component 138 mechanically fails and causes the catcher component 140 to move relative to the catcher aperture C1, the catcher component 140 indirectly engages the engine mount link 132 via the energy absorbing material 142 within the catcher aperture C1. Specifically, in the illustrated embodiment of FIG. 5C, when the fusible component 138 mechanically fails and causes the catcher component 140 to move relative to the catcher aperture C1, the catcher component 140 indirectly engages the second engine mount link 132B.

The movement of the catcher component 140 relative to the catcher aperture C1 causes the corresponding movement of the engine mount link 132 with respect to the engine mount block 134 along the first axis 111. Specifically, the movement of the catcher component 140 relative to the catcher aperture C1 causes the corresponding movement of the first and second engine mount links 132A, 132B with respect to the engine mount block 134 along the first axis 111. Further, if the catcher component 140 mechanically fails, the at least one catcher feature 350 can engage with at least a portion of the bottom wall 120 to provide a further mechanism for preventing detachment of the gas turbine engine 10 from the pylon 106.

Figure 6C:
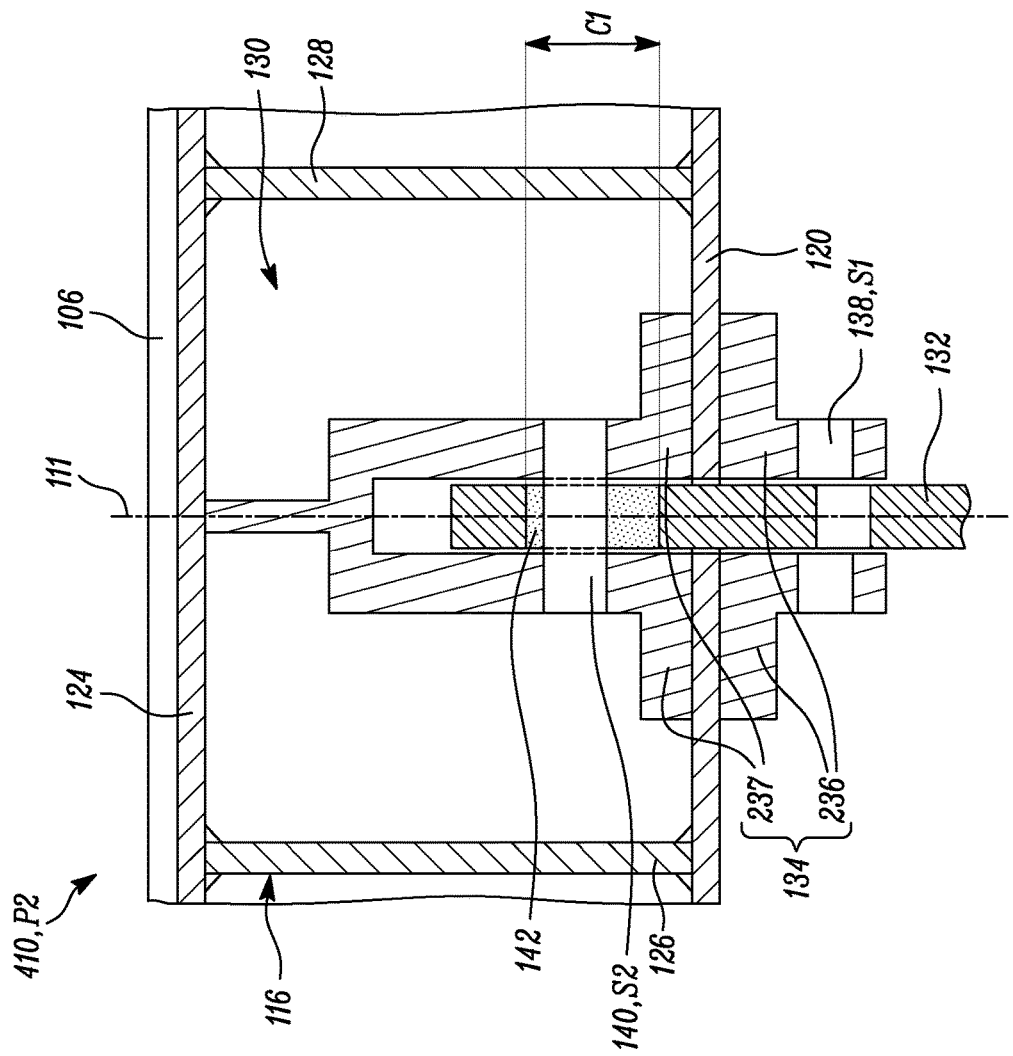
FIG. 6C is a schematic sectional front view of the mounting assembly of FIG. 6A in the second state.

FIG. 6A shows a schematic sectional front view of a mounting assembly 410 for securing the gas turbine engine 10 (shown in FIG. 2A and FIG. 2B) to the pylon 106, according to another embodiment of present disclosure. FIG. 6B is a schematic sectional side view of the mounting assembly 410 shown in FIG. 6A taken along a section line C-C' shown in FIG. 6A. Specifically, FIG. 6A and FIG. 6B illustrate the mounting assembly 410 in the first state P1. FIG. 6C is a schematic sectional front view of the mounting assembly 410 in the second state P2.

The mounting assembly 410 is substantially similar to the mounting assembly 210 illustrated in FIG. 4A, with common components being referred to by the same reference numerals. However, in the illustrated embodiment of FIGS. 6A-6C, the fusible component 138 is disposed between the catcher component 140 and the gas turbine engine 10 (shown in FIG. 2A and FIG. 2B) with respect to the first axis 111. Further, the catcher aperture C1 is defined within the engine mount link 132.

Further, in the illustrated embodiment of FIGS. 6A-6C, the first engine mount block 236 is connected to the bottom wall 120 of the pylon box 116 on the side proximal to the gas turbine engine 10 and the second engine mount block 237 is connected to the bottom wall 120 of the pylon box 116 on the side opposite to the first engine mount block 236. In FIG. 6A and FIG. 6C, the second engine mount block 237 is shown further connected to the top wall 124 of the pylon box 116, but it will be appreciated this is not necessary to the functioning of the second engine mount block 237.

In a similar fashion to the previously described embodiments, the fusible component 138 is connected to the first engine mount block 236, and the catcher component 140 is connected to the second engine mount block 237.

As is apparent from FIG. 6A and FIG. 6B, in the first state P1 of the mounting assembly 410, when the applied shear stress τ on the fusible component 138 is less than the first shear strength S1 of the fusible component 138, the engine mount link 132 is stationary with respect to the first engine mount block 236 as well as the second engine mount block 237, as the connections between the engine mount link 132, the fusible component 138, the first engine mount block 236 and second engine mount block 237 are fixed with respect to the first axis 111.

Further, as is apparent from FIG. 6C, in the second state P2 of the mounting assembly 410, when the applied shear stress τ on the fusible component 138 exceeds the first shear strength S1 of the fusible component 138, the fusible component 138 mechanically fails and causes the catcher component 140 to move relative to the catcher aperture C1. In the illustrated embodiment of FIG. 6C, when the fusible component 138 mechanically fails and causes the catcher component 140 to move relative to the catcher aperture C1, the catcher component 140 indirectly engages the engine mount link 132 via the energy absorbing material 142 within the catcher aperture C1.

The movement of the catcher component 140 relative to the catcher aperture C1 causes the corresponding movement of the engine mount link 132 with respect to the first and second engine mount blocks 236, 237 along the first axis 111.

Figures 7A, 7B:
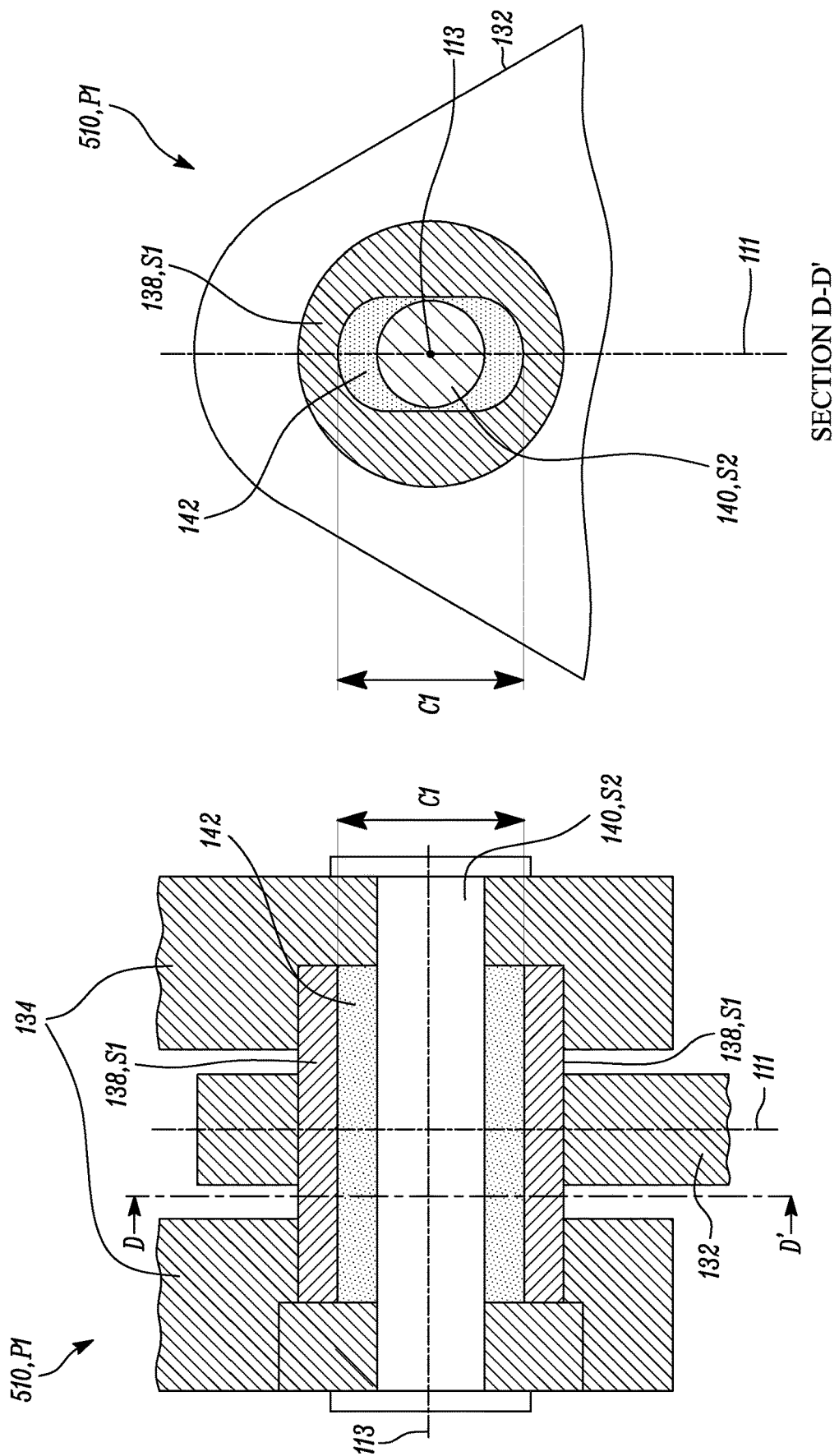
FIG. 7A is a schematic sectional front view of a mounting assembly in the first state, according to another embodiment of the present disclosure.
FIG. 7B is a schematic sectional side view of the mounting assembly along a section line D-D' of FIG. 7A in the first state.
Figure 7C:
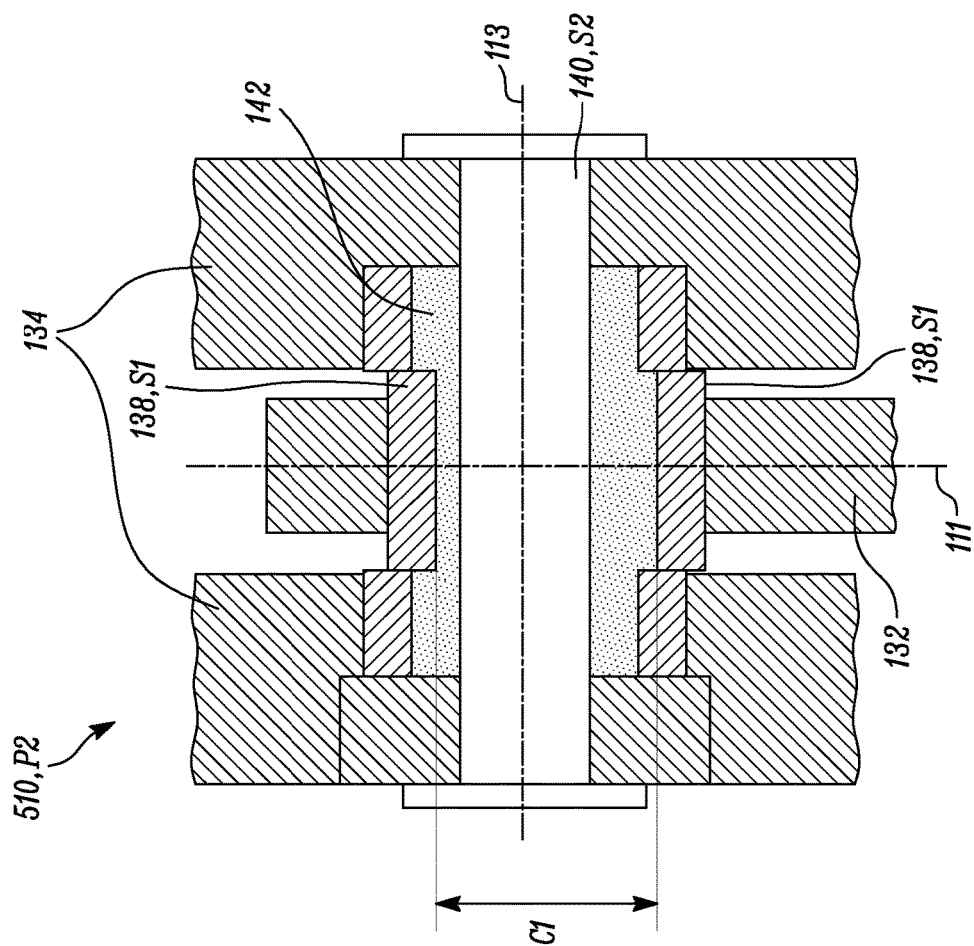
FIG. 7C is a schematic sectional front view of the mounting assembly of FIG. 7A in the second state.

FIG. 7A shows a schematic sectional front view of a mounting assembly 510 for securing the gas turbine engine 10 (shown in FIG. 2A and FIG. 2B) to the pylon 106, according to another embodiment of present disclosure. FIG. 7B is a schematic sectional side view of the mounting assembly 510 shown in FIG. 7A taken along a section line D-D' shown in FIG. 7A. Specifically, FIG. 7A and FIG. 7B illustrate the mounting assembly 510 in the first state P1. FIG. 7C is a schematic sectional front view of the mounting assembly 510 in the second state P2.

The mounting assembly 510 is functionally similar to the mounting assembly 110 illustrated in FIG. 3A, with common components being referred to by the same reference numerals. However, in the illustrated embodiment of FIGS. 7A-7C, the fusible component 138 is a bush. Further, the fusible component 138 at least partially surrounds the catcher component 140 about a second axis 113 orthogonal to the first axis 111. Therefore, the fusible component 138 and the catcher component 140 are at least partially coaxial about the second axis 113. Further, in the illustrated embodiment of FIGS. 7A-7C, the catcher aperture C1 is defined within the fusible component 138. In this example, the catcher aperture C1 has the oblong shape, such that the major axis is along the first axis 111, but it will be understood that the catcher aperture could have any other shape, for example an elliptical shape, providing there is relative clearance along the first axis 111 allowing for limited movement of the catcher component along the first axis 111. The skilled person will understand the fusible component 138 can comprise one or more anti-rotation features (not shown) to ensure the major axis of the catcher aperture C1 of the fusible component 138 is correctly aligned with the first axis 111 when installed within the engine mount link 132, as shown in FIG. 7B.

In some embodiments, the mounting assembly 510 may directly couple with the pylon 106 (shown in FIG. 2A and FIG. 2B). In other words, the mounting assembly 110 may not include the pylon box 116 (shown in FIG. 3A). However, in some other embodiments, the mounting assembly 510 may also include the pylon box 116 and the engine mount block 134 may be directly or indirectly connected to the pylon box 116.

As is apparent from FIG. 7A and FIG. 7B, in the first state P1 of the mounting assembly 510, when the applied shear stress τ on the fusible component 138 is less than the first shear strength S1 of the fusible component 138, the engine mount link 132 is stationary with respect to the engine mount block 134, as the connections between the engine mount link 132, the fusible component 138, and the engine mount block 134 are fixed with respect to the first axis 111.

Further, as is apparent from FIG. 7C, in the second state P2 of the mounting assembly 510, when the applied shear stress τ on the fusible component 138 exceeds the first shear strength S1 of the fusible component 138, the fusible component 138 mechanically fails and causes the catcher component 140 to move relative to the catcher aperture C1. In the illustrated embodiment of FIG. 7C, in the second state P2 of the mounting assembly 510, when the applied shear stress τ on the fusible component 138 exceeds the first shear strength S1 of the fusible component 138, the fusible component 138 mechanically fails causing the first engine mound link 132 to move relative to the catcher component. This further causes a portion of the catcher aperture C1 defined within the portion of the fusible component 138 to move. Therefore, the catcher component 140 connected to the engine mount block 134 and disposed within the catcher aperture C1 moves relative to the catcher aperture C1. Furthermore, when the fusible component 138 mechanically fails and causes the catcher component 140 to move relative to the catcher aperture C1, the catcher component 140 indirectly engages the engine mount link 132 via the energy absorbing material 142 within the catcher aperture C1.

Figures 8A, 8B:
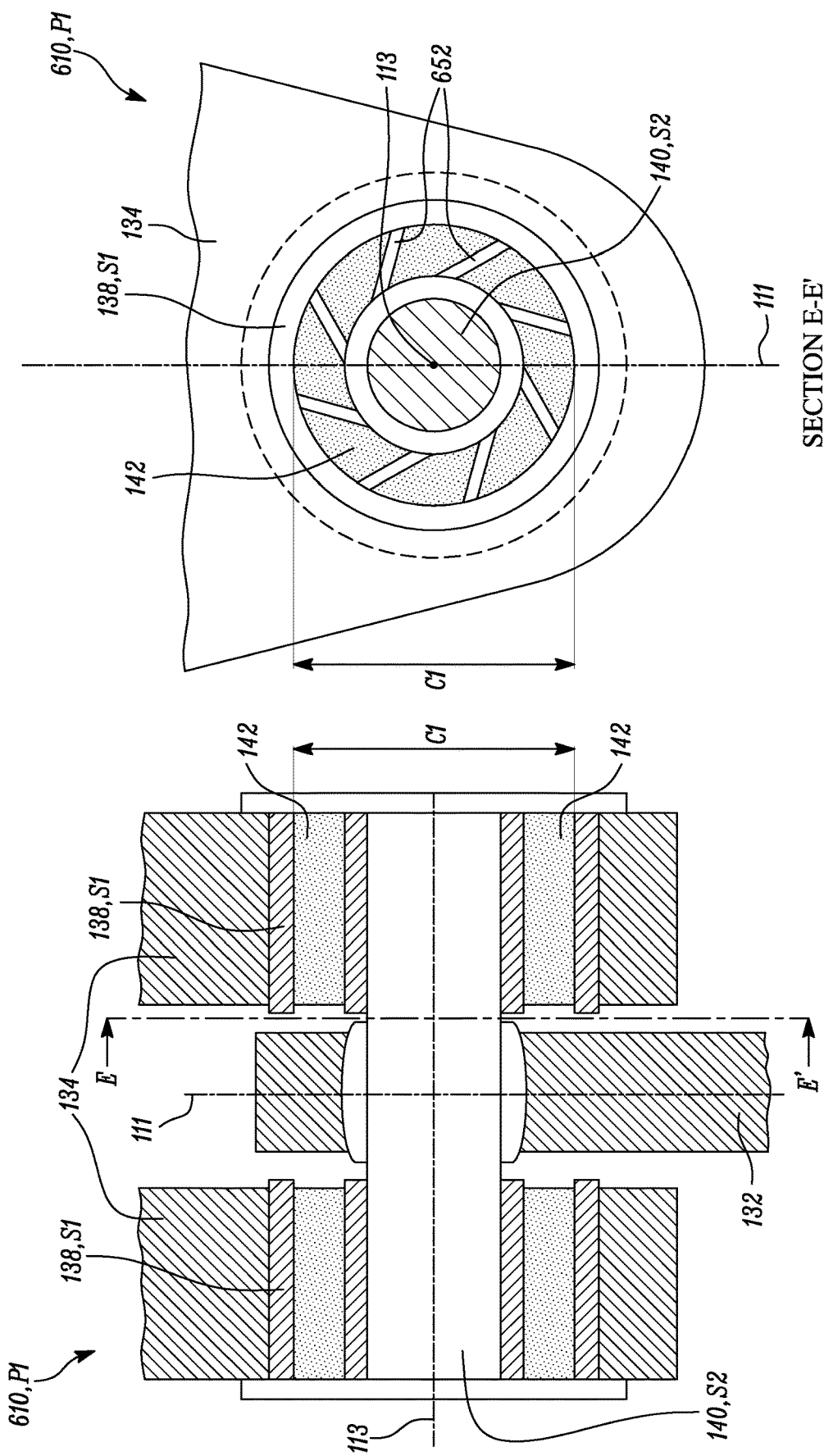
FIG. 8A is a schematic sectional front view of a mounting assembly in the first state, according to another embodiment of the present disclosure.
FIG. 8B is a schematic sectional side view of the mounting assembly along a section line E-E' of FIG. 8A in the first state.
Figure 8C:
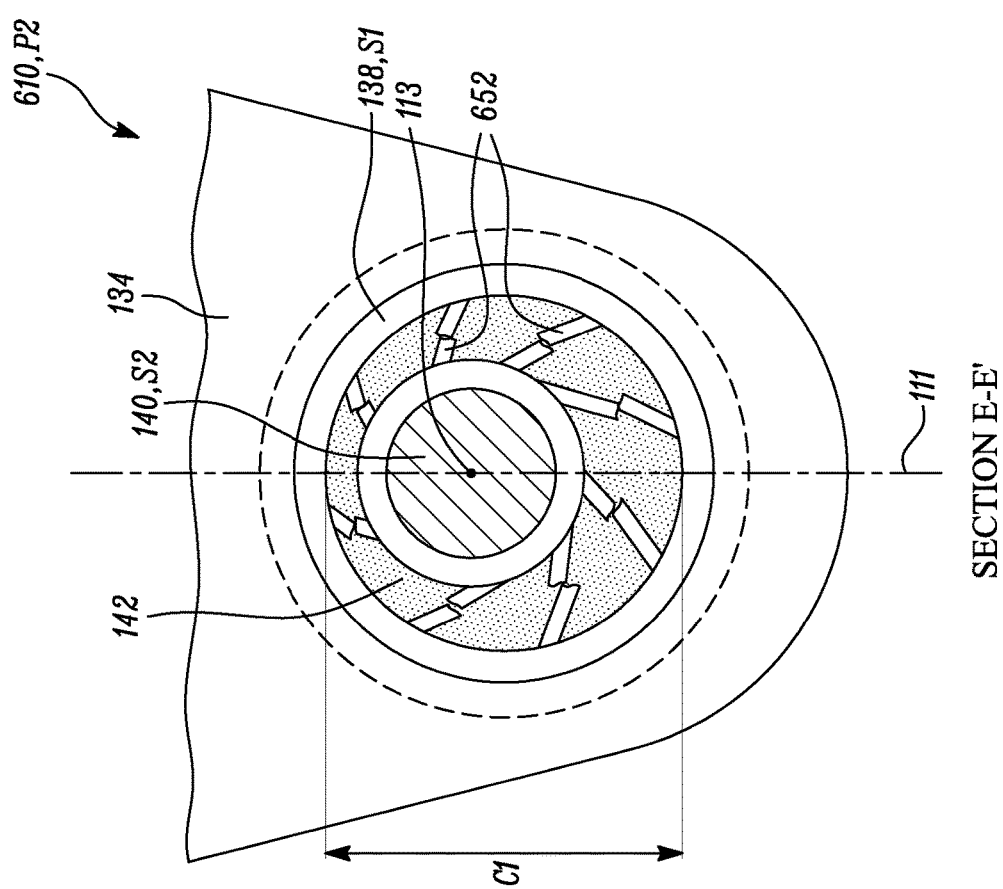
FIG. 8C is a schematic sectional side view of the mounting assembly along the section line E-E' of FIG. 8A in the second state.

FIG. 8A shows a schematic sectional front view of a mounting assembly 610 for securing the gas turbine engine 10 (shown in FIG. 2A and FIG. 2B) to the pylon 106 (shown in FIGS. 2A and 2B), according to another embodiment of present disclosure. FIG. 8B is a schematic sectional side view of the mounting assembly 610 taken along a section line E-E' shown in FIG. 8A. Specifically, FIG. 8A and FIG. 8B illustrate the mounting assembly 610 in the first state P1. FIG. 8C is a schematic sectional side view of the mounting assembly 610 in the second state P2.

The mounting assembly 610 is substantially similar to the mounting assembly 510, with common components being referred to by the same reference numerals. However, in the illustrated embodiment of FIGS. 8A-8C, the fusible component 138 includes a plurality of spokes 652 (not visible in FIG. 8A). Each of the plurality of spokes 652 is inclined relative to the first axis 111. Further, each of the plurality of spokes 652 extends between the engine mount block 134 and the catcher component 140. In some embodiments, the plurality of spokes 652 may be made of any suitable material, such as a metallic material, a polymeric material, a composite material, or a combination thereof. Further, the catcher aperture C1 is defined within the engine mount block 134.

As is apparent from FIG. 8A and FIG. 8B, in the first state P1 of the mounting assembly 610, when the applied shear stress τ on the fusible component 138 is less than the first shear strength S1 of the fusible component 138, the engine mount link 132 is stationary with respect to the engine mount block 134. Specifically, in the first state P1 of the mounting assembly 710, when the applied shear stress τ on the plurality of spokes 652 is less than the first shear strength S1 of the plurality of spokes 652, the engine mount link 132 is stationary with respect to the engine mount block 134, as the connections between the engine mount link 132, the fusible component 138, and the engine mount block 134 are fixed with respect to the first axis 111.

Further, as is apparent from FIG. 8C, in the second state P2 of the mounting assembly 610, when the applied shear stress τ on the fusible component 138 exceeds the first shear strength S1 of the fusible component 138, the fusible component 138 mechanically fails and causes the catcher component 140 to move relative to the catcher aperture C1. In the illustrated embodiment of FIG. 8C, when the fusible component 138 mechanically fails and causes the catcher component 140 to move relative to the catcher aperture C1, the catcher component 140 indirectly engages the engine mount block 134 via a combination of the energy absorbing material 142 within the catcher aperture C1 and the mechanically failed fusible component 138. In FIG. 8C, the second state P2 of the mounting assembly 610 is illustrated with each of the plurality of spokes 652 in a failed state, such that the fusible component 138 mechanically fails. Specifically, in the second state P2 of the mounting assembly 610, with each of the plurality of spokes 652 broken, the catcher component 140 is able to move relative to the catcher aperture C1, e.g. along the first axis 111, however as the radial clearance is uniform/constant around the catcher, the relative motion may happen in any direction, not just or preferentially along the first axis 111.

Figures 9A, 9B:
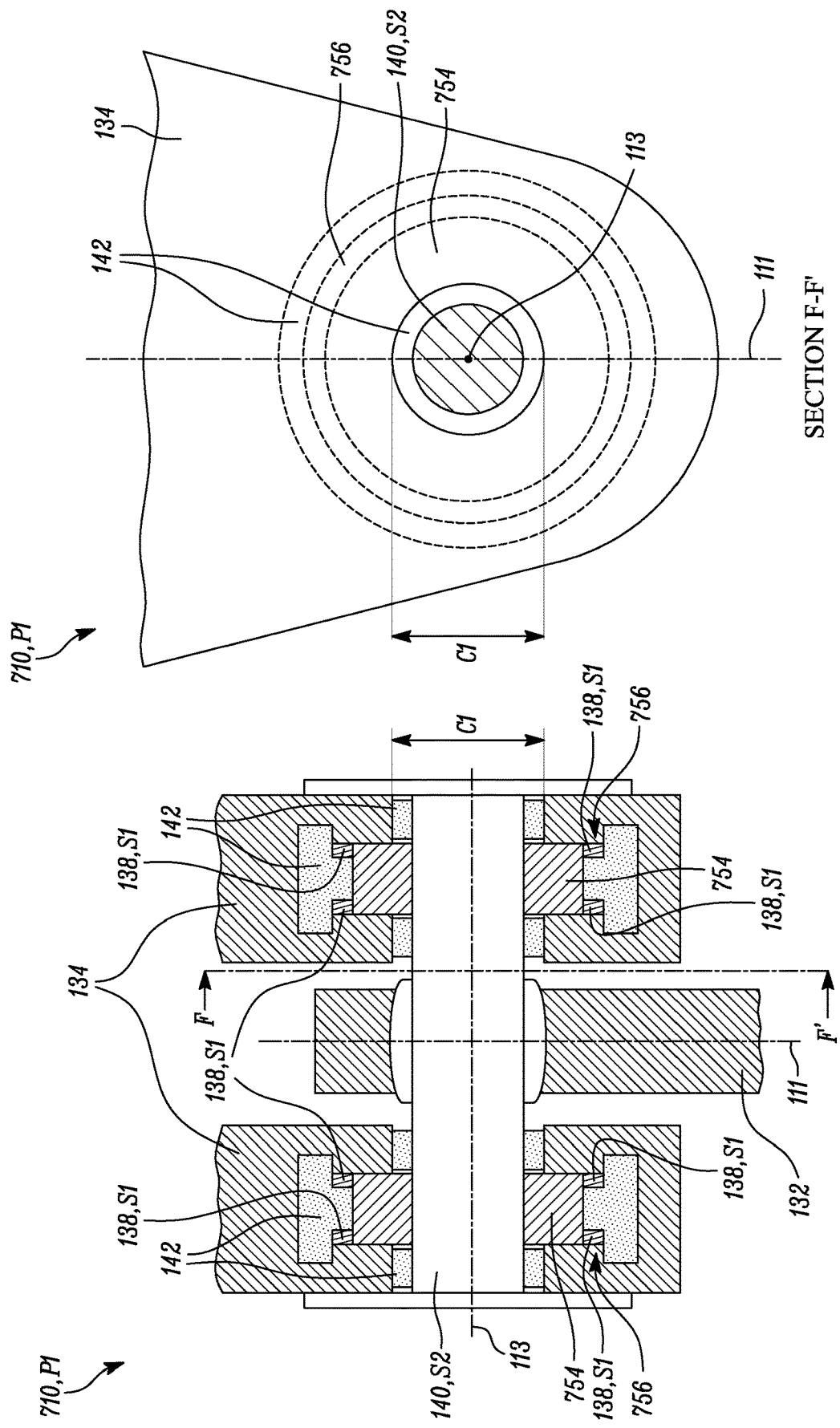
FIG. 9A is a schematic sectional front view of a mounting assembly in the first state, according to another embodiment of the present disclosure.
FIG. 9B is a schematic sectional side view of the mounting assembly along a section line F-F' of FIG. 9A in the first state.
Figure 9C:
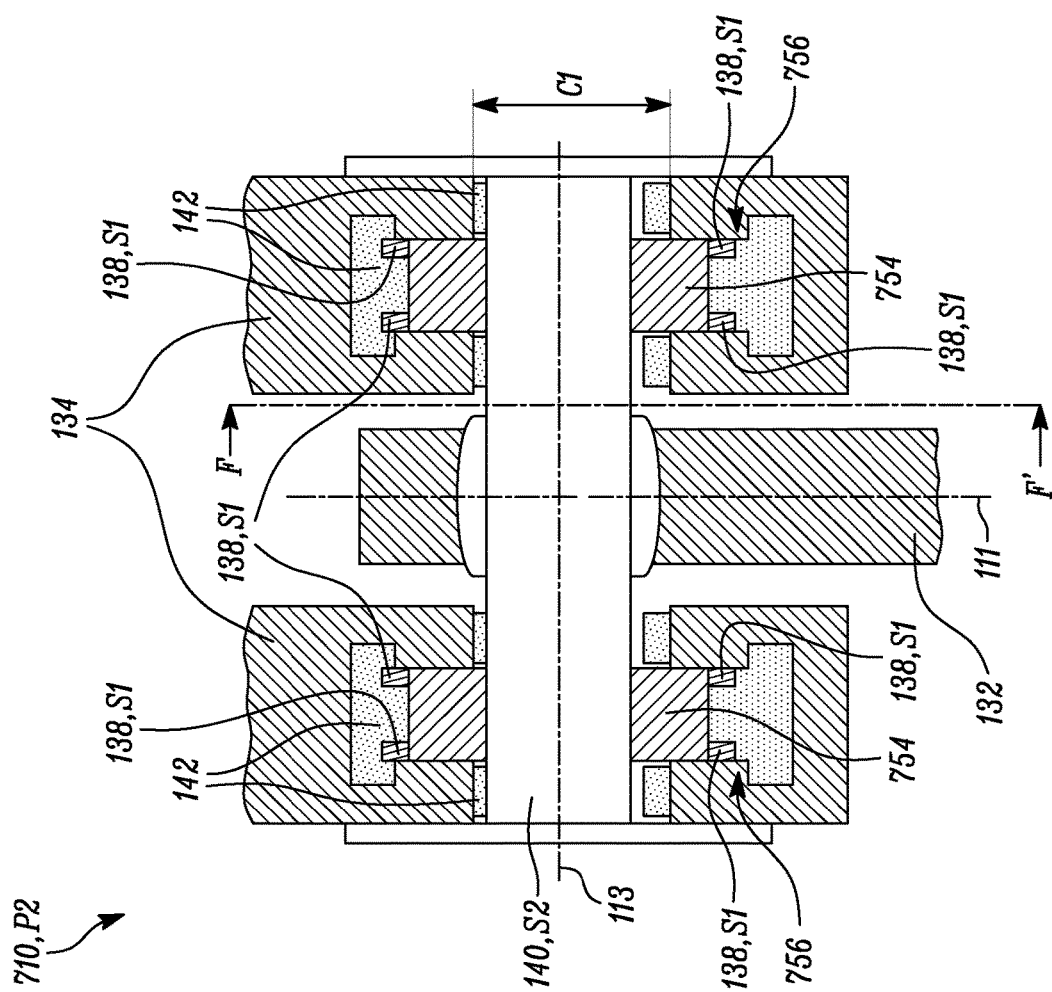
FIG. 9C is a schematic sectional front view of the mounting assembly of FIG. 9A in the second state.

FIG. 9A shows a schematic sectional front view of a mounting assembly 710 for securing the gas turbine engine 10 (shown in FIG. 2A and FIG. 2B) to the pylon 106 (shown in FIG. 2A and FIG. 2B), according to another embodiment of present disclosure. FIG. 9B is a schematic sectional side view of the mounting assembly 710 shown in FIG. 9A taken along a section line F-F' shown in FIG. 9A. Specifically, FIG. 9A and FIG. 9B illustrate the mounting assembly 710 in the first state P1. FIG. 9C is a schematic sectional front view of the mounting assembly 710 in the second state P2.

The mounting assembly 710 is substantially similar to the mounting assembly 610 illustrated in FIG. 8A, with common components being referred to by the same reference numerals. However, in the illustrated embodiment of FIGS. 9A-9C, the engine mount block 134 includes a pair of bushings 754 disposed on opposite sides of the engine mount link 132. Further, the catcher aperture C1 is defined within the engine mount block 134.

In the exemplary embodiment illustrated in FIG. 9A, the fusible component 138 includes a pair of radial spigots 756 corresponding to the pair of bushings 754. Each of the pair of radial spigots 756 is at least partially disposed between a corresponding bushing 754 from the pair of bushings 754 and the engine mount block 134. Further, each of the pair of bushings 754 at least partially surrounds the catcher component 140 about the second axis 113 orthogonal to the first axis 111. The pair of bushings 754 may be made of any suitable material, such as a metallic material, a polymeric material, composite material, or a combination thereof. The material of the pair of bushings 754 may be substantially similar to the material of the engine mount block 134, or it may be different from the material of the engine mount block 134. The material of the pair of bushings 754 may be integral to the engine mount block 134.

As is apparent from FIG. 9A and FIG. 9B, in the first state P1 of the mounting assembly 710, when the applied shear stress τ on the fusible component 138 is less than the first shear strength S1 of the fusible component 138, the engine mount link 132 is stationary with respect to the engine mount block 134. Specifically, in the first state P1 of the mounting assembly 710, when the applied shear stress τ on the pair of radial spigots 756 is less than the first shear strength S1 of the pair of radial spigots 756, the engine mount link 132 is stationary with respect to the engine mount block 134.

Further, as is apparent from FIG. 9C, in the second state P2 of the mounting assembly 710, when the applied shear stress τ on the fusible component 138 exceeds the first shear strength S1 of the fusible component 138, the fusible component 138 mechanically fails and causes the catcher component 140 to move relative to the catcher aperture C1. In the illustrated embodiment of FIG. 9C, when the fusible component 138 mechanically fails and causes the catcher component 140 to move relative to the catcher aperture C1, the catcher component 140 indirectly engages the engine mount block 134. Specifically, in the second state P2 of the mounting assembly 710, at least one of the pair of radial spigots 756 mechanically fails, breaking away from the engine mount block 134, causing the catcher component 140 to move relative to the catcher aperture C1. In FIG. 9C, all four of the fusible components 138 have broken away from the engine mount block 134, and, because the fusible components 138 encircle the bushings of the pair of bushings 754, they will move with the pair of bushings 754 as the catcher component 140 moves within the catcher aperture C1. The movement of the catcher component 140 relative to the catcher aperture C1 causes the corresponding movement of the engine mount link 132 with respect to the engine mount block 134, e.g. along the first axis 111.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A mounting assembly for securing a gas turbine engine to a pylon, the mounting assembly comprising:
   an engine mount link extending from the gas turbine engine towards the pylon along a first axis;
   an engine mount block connected to the pylon and the engine mount link;
   a fusible component connected to the engine mount block, wherein the fusible component has a first shear strength; and
   a catcher component connected to the engine mount block and disposed within a catcher aperture defined within at least one of the engine mount link, the engine mount block, and the fusible component, wherein the catcher component has a second shear strength greater than the first shear strength of the fusible component;
   wherein in a first state of the mounting assembly, when an applied shear stress on the fusible component is less than the first shear strength of the fusible component, the engine mount link is stationary with respect to the engine mount block;
   wherein in a second state of the mounting assembly, when the applied shear stress on the fusible component exceeds the first shear strength of the fusible component, the fusible component mechanically fails and causes the catcher component to move relative to the catcher aperture; and
   wherein a movement of the catcher component relative to the catcher aperture causes a corresponding movement of the engine mount link with respect to the engine mount block along the first axis;
   wherein the fusible component is spaced apart from the catcher component along the first axis.

2. The mounting assembly of claim 1, wherein the catcher component is disposed between the fusible component and the gas turbine engine with respect to the first axis.

3. The mounting assembly of claim 1, wherein when the fusible component mechanically fails and causes the catcher component to move relative to the catcher aperture, the catcher component engages the engine mount link or the engine mount block.

4. The mounting assembly of claim 1, further comprising an energy absorbing material disposed in at least a portion of the catcher aperture.

5. The mounting assembly of claim 4, wherein when the fusible component mechanically fails and causes the catcher component to move relative to the catcher aperture, the catcher component deforms the energy absorbing material.

6. The mounting assembly of claim 1, further comprising:
   a pylon box comprising a bottom wall proximal to the gas turbine engine and comprising a bottom opening therethrough, a top wall opposite to the bottom wall, a first side wall extending between the bottom wall and the top wall along the first axis, and a second side wall opposite to the first side wall and extending between the bottom wall and the top wall along the first axis, wherein the first side wall, the second side wall, the bottom wall, and the top wall together define a pylon cavity therebetween, wherein the engine mount link is at least partially disposed in the pylon cavity and extends from the bottom wall of the pylon box through the bottom opening.

7. The mounting assembly of claim 1, wherein the second shear strength is greater than the first shear strength by at least 10%.

8. An aircraft including:
a fuselage;
a wing extending from the fuselage;
a pylon attached to the wing;
a gas turbine engine; and
the mounting assembly of claim 1, wherein the mounting assembly secures the gas turbine engine to the pylon.

9. A mounting assembly for securing a gas turbine engine to a pylon, the mounting assembly comprising:
an engine mount link extending from the gas turbine engine towards the pylon along a first axis;
an engine mount block connected to the pylon and the engine mount link;
a fusible component connected to the engine mount block, wherein the fusible component has a first shear strength;
a catcher component connected to the engine mount block and disposed within a catcher aperture defined within at least one of the engine mount link, the engine mount block, and the fusible component, wherein the catcher component has a second shear strength greater than the first shear strength of the fusible component;
a pylon box comprising a bottom wall proximal to the gas turbine engine and comprising a bottom opening therethrough, a top wall opposite to the bottom wall, a first side wall extending between the bottom wall and the top wall along the first axis, and a second side wall opposite to the first side wall and extending between the bottom wall and the top wall along the first axis, wherein the first side wall, the second side wall, the bottom wall, and the top wall together define a pylon cavity therebetween, wherein the engine mount link is at least partially disposed in the pylon cavity and extends from the bottom wall of the pylon box through the bottom opening; and
wherein in a first state of the mounting assembly, when an applied shear stress on the fusible component is less than the first shear strength of the fusible component, the engine mount link is stationary with respect to the engine mount block;
wherein in a second state of the mounting assembly, when the applied shear stress on the fusible component exceeds the first shear strength of the fusible component, the fusible component mechanically fails and causes the catcher component to move relative to the catcher aperture; and
wherein a movement of the catcher component relative to the catcher aperture causes a corresponding movement of the engine mount link with respect to the engine mount block along the first axis.

* * * * *